United States Patent
Luft

(10) Patent No.: US 12,425,476 B2
(45) Date of Patent: Sep. 23, 2025

(54) IMMUTABLE LEDGER METHOD AND APPARATUS FOR MANAGING THE DISTRIBUTION OF CONTENT

(71) Applicant: Netskrt Systems, Inc., Vancouver (CA)

(72) Inventor: Siegfried Luft, Vancouver (CA)

(73) Assignee: Netskrt Systems, Inc., Vancouver (CA)

( * ) Notice: Subject to any disclaimer, the term of this patent is extended or adjusted under 35 U.S.C. 154(b) by 0 days.

(21) Appl. No.: 18/231,407

(22) Filed: Aug. 8, 2023

(65) Prior Publication Data

US 2024/0223650 A1   Jul. 4, 2024

Related U.S. Application Data

(63) Continuation of application No. 17/868,642, filed on Jul. 19, 2022, now Pat. No. 11,736,563, which is a (Continued)

(51) Int. Cl.
*H04L 67/104* (2022.01)
*H04L 9/08* (2006.01)
(Continued)

(52) U.S. Cl.
CPC ............ *H04L 67/104* (2013.01); *H04L 9/088* (2013.01); *H04L 61/2514* (2013.01);
(Continued)

(58) Field of Classification Search
CPC ... H04L 67/104; H04L 67/5682; H04L 9/088; H04L 61/2514; H04L 2209/60; H04N 21/482
See application file for complete search history.

(56) References Cited

U.S. PATENT DOCUMENTS

| | | |
|---|---|---|
| 6,785,704 B1 | 8/2004 | McCanne |
| 7,430,614 B2 | 9/2008 | Shen et al. |

(Continued)

FOREIGN PATENT DOCUMENTS

| | | |
|---|---|---|
| EP | 3763139 A1 | 1/2021 |
| FR | 3050349 A1 | 10/2017 |

(Continued)

OTHER PUBLICATIONS

Corrected Notice of Allowance, U.S. Appl. No. 15/933,330, Sep. 23, 2020, 5 pages.
(Continued)

*Primary Examiner* — Glenton B Burgess
*Assistant Examiner* — Patrick F Ngankam
(74) *Attorney, Agent, or Firm* — NICHOLSON DE VOS WEBSTER & ELLIOTT LLP

(57) ABSTRACT

A system comprising a plurality of peer caches associated with a corresponding plurality of content owners; shared ledger logic having a channel for each content owner of a plurality of content owners, the shared ledger logic to maintain a shared ledger data structure and to perform the operations of: in response to receipt of a first content title, responsively recording a first ledger entry for the first content title which is visible to a first content owner which owns the first content title; receiving an encryption key from the content owner, wherein the first content title comprises an encrypted content title encrypted with the key; storing the encrypted content title on one or more network storage devices; and when the encrypted content title reaches an edge cache, using the key to decrypt the encrypted content title and updating the first ledger entry to identify the edge cache.

20 Claims, 25 Drawing Sheets

Related U.S. Application Data continuation of application No. 16/863,411, filed on Apr. 30, 2020, now Pat. No. 11,399,058, which is a continuation-in-part of application No. 15/933,327, filed on Mar. 22, 2018, now Pat. No. 10,771,582, and a continuation-in-part of application No. 15/933,330, filed on Mar. 22, 2018, now Pat. No. 10,904,351, and a continuation-in-part of application No. 15/933,336, filed on Mar. 22, 2018, now Pat. No. 10,778,800, and a continuation-in-part of application No. 15/933,332, filed on Mar. 22, 2018, now Pat. No. 10,880,394, and a continuation-in-part of application No. 15/933,338, filed on Mar. 22, 2018, now Pat. No. 10,911,559, application No. 18/231,407 is a continuation-in-part of application No. 15/933,338, filed on Mar. 22, 2018, now Pat. No. 10,911,559.

(60) Provisional application No. 62/842,414, filed on May 2, 2019, provisional application No. 62/842,408, filed on May 2, 2019, provisional application No. 62/842,447, filed on May 2, 2019, provisional application No. 62/842,457, filed on May 2, 2019, provisional application No. 62/842,427, filed on May 2, 2019, provisional application No. 62/842,446, filed on May 2, 2019, provisional application No. 62/842,383, filed on May 2, 2019, provisional application No. 62/842,397, filed on May 2, 2019.

(51) Int. Cl.
*H04L 61/2514* (2022.01)
*H04L 67/5682* (2022.01)
*H04N 21/482* (2011.01)

(52) U.S. Cl.
CPC ....... *H04L 67/5682* (2022.05); *H04N 21/482* (2013.01); *H04L 2209/60* (2013.01)

(56) References Cited

U.S. PATENT DOCUMENTS

| | | |
|---|---|---|
| 7,454,457 B1 | 11/2008 | Lowery et al. |
| 8,756,341 B1 | 6/2014 | Richardson et al. |
| 10,182,269 B1 | 1/2019 | Samant et al. |
| 10,484,308 B2 | 11/2019 | Liu et al. |
| 11,102,260 B1 | 8/2021 | Wu et al. |
| 2002/0073240 A1 | 6/2002 | Kokkinen et al. |
| 2003/0005152 A1 | 1/2003 | Diwan et al. |
| 2004/0057443 A1 | 3/2004 | Kim et al. |
| 2005/0034158 A1 | 2/2005 | DeLaVega |
| 2009/0006724 A1 | 1/2009 | Chang et al. |
| 2009/0132640 A1 | 5/2009 | Verma et al. |
| 2009/0219900 A1 | 9/2009 | Kokkinen et al. |
| 2010/0088505 A1 | 4/2010 | Coppola et al. |
| 2011/0082946 A1 | 4/2011 | Gopalakrishnan |
| 2011/0116373 A1 | 5/2011 | Lauer |
| 2011/0164562 A1 | 7/2011 | Qiu et al. |
| 2011/0257834 A1 | 10/2011 | Hebb |
| 2011/0302320 A1 | 12/2011 | Dunstan et al. |
| 2011/0320554 A1 | 12/2011 | Melander et al. |
| 2012/0232791 A1 | 9/2012 | Sterkel et al. |
| 2012/0320624 A1 | 12/2012 | Yamane et al. |
| 2012/0320824 A1 | 12/2012 | Bari et al. |
| 2013/0054728 A1 | 2/2013 | Amir et al. |
| 2013/0097309 A1 | 4/2013 | Ma et al. |
| 2013/0104251 A1 | 4/2013 | Moore et al. |
| 2013/0132544 A1 | 5/2013 | Krishnan et al. |
| 2014/0219230 A1 | 8/2014 | Schierl et al. |
| 2014/0223502 A1 | 8/2014 | Doblmaier et al. |
| 2014/0280679 A1* | 9/2014 | Dey ................... H04L 67/568 709/213 |
| 2014/0297881 A1 | 10/2014 | Shivadas et al. |
| 2014/0365557 A1 | 12/2014 | Maehara et al. |
| 2014/0379871 A1 | 12/2014 | Van et al. |
| 2015/0120768 A1 | 4/2015 | Wellen et al. |
| 2015/0134754 A1 | 5/2015 | Lauer et al. |
| 2015/0150061 A1 | 5/2015 | Bleacher et al. |
| 2015/0188923 A1 | 7/2015 | Snyder |
| 2015/0215738 A1* | 7/2015 | Frusina ................ H04N 21/422 455/552.1 |
| 2015/0326636 A1 | 11/2015 | Surmay |
| 2016/0020946 A1 | 1/2016 | Morper |
| 2016/0044125 A1 | 2/2016 | Hardin et al. |
| 2016/0044129 A1 | 2/2016 | Bergmann et al. |
| 2016/0080279 A1 | 3/2016 | Tan et al. |
| 2016/0080445 A1 | 3/2016 | Kazerani et al. |
| 2016/0142510 A1 | 5/2016 | Westphal et al. |
| 2016/0182966 A1 | 6/2016 | Hao et al. |
| 2016/0191651 A1 | 6/2016 | Balakrishnan et al. |
| 2016/0191664 A1 | 6/2016 | Balakrishnan et al. |
| 2016/0234126 A1 | 8/2016 | Phillips et al. |
| 2016/0234346 A1 | 8/2016 | Degani |
| 2016/0249182 A1* | 8/2016 | Bourlas ................... H04W 4/00 |
| 2016/0262190 A1 | 9/2016 | Bitar et al. |
| 2016/0269459 A1 | 9/2016 | Harden et al. |
| 2016/0269801 A1 | 9/2016 | Harden et al. |
| 2016/0286457 A1 | 9/2016 | O'Hare et al. |
| 2016/0295297 A1 | 10/2016 | Yamagishi |
| 2016/0308958 A1 | 10/2016 | Navali et al. |
| 2016/0316234 A1 | 10/2016 | Casey et al. |
| 2016/0337426 A1 | 11/2016 | Shribman et al. |
| 2016/0350815 A1 | 12/2016 | Qiu et al. |
| 2016/0366202 A1* | 12/2016 | Phillips .............. H04N 21/8456 |
| 2017/0024201 A1 | 1/2017 | Diedrich et al. |
| 2017/0078729 A1 | 3/2017 | Karlsson et al. |
| 2017/0124296 A1 | 5/2017 | Baldwin et al. |
| 2017/0126256 A1 | 5/2017 | Salomons et al. |
| 2017/0177898 A1 | 6/2017 | Dillenberger |
| 2017/0195451 A1 | 7/2017 | Backholm |
| 2017/0257446 A1 | 9/2017 | Bevilacqua et al. |
| 2017/0339224 A1 | 11/2017 | Condeixa et al. |
| 2017/0347236 A1 | 11/2017 | Frusina et al. |
| 2017/0353506 A1 | 12/2017 | Warrick et al. |
| 2017/0353574 A1 | 12/2017 | Lavi et al. |
| 2018/0020042 A1 | 1/2018 | Couleaud et al. |
| 2018/0053215 A1 | 2/2018 | E Costa |
| 2018/0160159 A1 | 6/2018 | Asarikuniyil |
| 2018/0167789 A1 | 6/2018 | Tsuchida et al. |
| 2018/0227350 A1 | 8/2018 | Padmanabhan et al. |
| 2018/0242230 A1 | 8/2018 | Grinshpun et al. |
| 2018/0367613 A1 | 12/2018 | Regmi et al. |
| 2019/0020701 A1 | 1/2019 | Barritt et al. |
| 2019/0109896 A1 | 4/2019 | Crowder et al. |
| 2019/0191355 A1 | 6/2019 | Apostolopoulos et al. |
| 2019/0207671 A1 | 7/2019 | Awad |
| 2019/0230401 A1 | 7/2019 | Chamberlain et al. |
| 2019/0306265 A1 | 10/2019 | Hakansson et al. |
| 2020/0205022 A1 | 6/2020 | Tumuluru |
| 2020/0218658 A1* | 7/2020 | Pack ..................... G06F 16/00 |
| 2022/0345545 A1 | 10/2022 | Luft |

FOREIGN PATENT DOCUMENTS

| | | |
|---|---|---|
| JP | 2003-208371 A | 7/2003 |
| JP | 2010-013072 A | 1/2010 |
| JP | 2012-521129 A | 9/2012 |
| JP | 2014-239405 A | 12/2014 |
| JP | 2015-153360 A | 8/2015 |
| JP | 2017-034678 A | 2/2017 |
| WO | 2018/126076 A1 | 7/2018 |
| WO | 2019/120537 A1 | 6/2019 |

OTHER PUBLICATIONS

Decision to Grant, JP App. No. 2020-546923, Aug. 28, 2023, 4 pages (2 pages of English Translation and 2 pages of Original Document).

Dilley et al., "Globally Distributed Content Delivery," IEEE Internet Computing, Sep.-Oct. 2002, pp. 50-58.

(56) References Cited

OTHER PUBLICATIONS

European Communication pursuant to Rules 70(2) and 70a(2) EPC, EP App. No. 19765006.2, Oct. 26, 2021, 1 page.
Final Office Action, U.S. Appl. No. 15/933,327, Feb. 18, 2020, 30 pages.
Final Office Action, U.S. Appl. No. 15/933,330, Jan. 15, 2020, 16 pages.
Final Office Action, U.S. Appl. No. 15/933,332, Mar. 5, 2020, 25 pages.
Final Office Action, U.S. Appl. No. 15/933,336, Mar. 30, 2020, 38 pages.
Final Office Action, U.S. Appl. No. 15/933,338, May 14, 2020, 36 pages.
Final Office Action, U.S. Appl. No. 16/863,431, Jun. 3, 2021, 15 pages.
Final Office Action, U.S. Appl. No. 17/164,404, Dec. 13, 2021, 20 pages.
Final Office Action, U.S. Appl. No. 17/831,174, Jul. 25, 2023, 10 pages.
Final Office Action, U.S. Appl. No. 17/863,089, Oct. 5, 2023, 24 pages.
Final Office Action, U.S. Appl. No. 17/868,642, Jan. 26, 2023, 16 pages.
Hare et al., "Beyond Deployments and Testbeds: Experiences with Public Usage on Vehicular WiFi Hotspots," MobiSys'12, Jun. 25-29, 2012, pp. 393-406.
International Preliminary Report on Patentability, PCT App. No. PCT/US2019/020487, Sep. 17, 2020, 11 pages.
International Preliminary Report on Patentability, PCT App. No. PCT/US2020/030973, Nov. 11, 2021, 10 pages.
International Preliminary Report on Patentability, PCT App. No. PCT/US22/32260, Dec. 14, 2023, 8 pages.
International Search Report and Written Opinion for Application No. PCT/US2019/020487, Jul. 5, 2019, 14 pages.
International Search Report and Written Opinion, PCT App. No. PCT/US2020/30973, Jul. 21, 2020, 11 pages.
International Search Report and Written Opinion, PCT App. No. PCT/US2022/032260, Oct. 11, 2022, 9 pages.
Jiang et al., "TransFetch: A Viewing Behavior Driven Video Distribution Framework in Public Transport", 2016 IEEE 41st Conference on Local Computer Networks (LCN), IEEE, Nov. 7, 2016, pp. 147-155.
Non-Final Office Action, U.S. Appl. No. 15/933,327, Aug. 27, 2019, 28 pages.
Non-Final Office Action, U.S. Appl. No. 15/933,330, Aug. 26, 2019, 14 pages.
Non-Final Office Action, U.S. Appl. No. 15/933,332, Aug. 22, 2019, 23 pages.
Non-Final Office Action, U.S. Appl. No. 15/933,336, Sep. 19, 2019, 34 pages.
Non-Final Office Action, U.S. Appl. No. 15/933,338, Nov. 18, 2019, 34 pages.
Non-Final Office Action, U.S. Appl. No. 16/863,342, Aug. 3, 2021, 21 pages.
Non-Final Office Action, U.S. Appl. No. 16/863,373, Sep. 3, 2021, 26 pages.
Non-Final Office Action, U.S. Appl. No. 16/863,390, Aug. 18, 2021, 19 pages.
Non-Final Office Action, U.S. Appl. No. 16/863,411, Sep. 24, 2021, 21 pages.
Non-Final Office Action, U.S. Appl. No. 16/863,431, Dec. 9, 2020, 12 pages.
Non-Final Office Action, U.S. Appl. No. 16/863,516, Sep. 30, 2021, 32 pages.
Non-Final Office Action, U.S. Appl. No. 16/863,542, Dec. 4, 2020, 10 pages.
Non-Final Office Action, U.S. Appl. No. 17/164,404, Aug. 19, 2021, 20 pages.
Non-Final Office Action, U.S. Appl. No. 17/831,174, Feb. 16, 2024, 10 pages.
Non-Final Office Action, U.S. Appl. No. 17/831,174, Mar. 22, 2023, 11 pages.
Non-Final Office Action, U.S. Appl. No. 17/863,089, Mar. 24, 2023, 26 pages.
Non-Final Office Action, U.S. Appl. No. 17/868,642, Oct. 6, 2022, 25 pages.
Notice of Allowance received for U.S. Appl. No. 16/863,467, mailed on Jun. 28, 2021, 2 pages.
Notice of Allowance, U.S. Appl. No. 15/933,327, Jun. 15, 2020, 11 pages.
Notice of Allowance, U.S. Appl. No. 15/933,330, May 4, 2020, 10 pages.
Notice of Allowance, U.S. Appl. No. 15/933,330, Sep. 11, 2020, 9 pages.
Notice of Allowance, U.S. Appl. No. 15/933,332, Aug. 26, 2020, 9 pages.
Notice of Allowance, U.S. Appl. No. 15/933,336, Jul. 9, 2020, 12 pages.
Notice of Allowance, U.S. Appl. No. 15/933,338, Sep. 30, 2020, 8 pages.
Notice of Allowance, U.S. Appl. No. 16/863,342, Mar. 7, 2022, 11 pages.
Notice of Allowance, U.S. Appl. No. 16/863,373, Feb. 24, 2022, 10 pages.
Notice of Allowance, U.S. Appl. No. 16/863,390, Dec. 23, 2021, 10 pages.
Notice of Allowance, U.S. Appl. No. 16/863,411, Mar. 21, 2022, 13 pages.
Decision to Grant, JP App. No. 2021-564831, Nov. 7, 2024, 4 pages (2 pages of English Translation and 2 pages of Original Document).
Notice of Allowance, U.S. Appl. No. 16/863,431, Oct. 7, 2021, 8 pages.
Notice of Allowance, U.S. Appl. No. 16/863,467, Jun. 16, 2021, 18 pages.
Notice of Allowance, U.S. Appl. No. 16/863,516, Feb. 9, 2022, 10 pages.
Notice of Allowance, U.S. Appl. No. 16/863,516, Mar. 23, 2022, 6 pages.
Notice of Allowance, U.S. Appl. No. 16/863,542, May 12, 2021, 9 pages.
Notice of Allowance, U.S. Appl. No. 17/164,404, Mar. 18, 2022, 19 pages.
Notice of Allowance, U.S. Appl. No. 17/868,642, Apr. 5, 2023, 11 pages.
Notice of Reasons for Refusal, JP App. No. 2020-546923, Mar. 6, 2023, 4 pages (2 pages of English Translation and 2 pages of Original Document).
Office Action, EP App. No. 19765006.2, Jul. 25, 2022, 8 pages.
Office Action, EP App. No. 20799471.6, Mar. 5, 2024, 6 pages.
Office Action, KR App. No. 10-2020-7025624, Mar. 4, 2024, 14 pages (07 pages of English Translation and 07 pages of Original Document).
Supplementary European Search Report and Search Opinion, EP App. No. 19765006.2, Oct. 8, 2021, 11 pages.
Supplementary European Search Report and Search Opinion, EP App. No. 20799471.6, Nov. 29, 2022, 12 pages.
Webster, Eva, "Definition: MIMO (multiple input, multiple output)", TechTarget.com, Available Online at <https://www.techtarget.com/searchmobilecomputing/definition/MIMO>, Retrieved on Mar. 21, 2023, 5 pages.
Notice of Allowance, KR App. No. 10-2020-7025624, Jul. 31, 2024, 3 pages (1 page of English Translation and 2 pages of Original Document).
Notice of Allowance, U.S. Appl. No. 17/831,174, Aug. 14, 2024, 14 pages.
Notice of Allowance, U.S. Appl. No. 17/863,089, Jul. 25, 2024, 5 pages.
Final Office Action, U.S. Appl. No. 17/831,174, May 14, 2024, 11 pages.
Intention to Grant, EP App. No. 19765006.2, Jun. 24, 2024, 6 pages.
Notice of Allowance, U.S. Appl. No. 17/863,089, Apr. 17, 2024, 7 pages.

(56) References Cited

OTHER PUBLICATIONS

Office Action, JP App. No. 2021-564831, Mar. 18, 2024, 6 pages (3 pages of English Translation and 3 pages of Original Document).
European Search Report and Search Opinion, EP App. No. 24189016.9, Nov. 13, 2024, 12 pages.
Office Action, KR App. No. 10-2021-7036935, Apr. 4, 2025, 35 pages (20 pages of English Translation and 15 pages of Original Document).
Office Action, EP App. No. 20799471.6, May 16, 2025, 5 pages.

* cited by examiner

IMMUTABLE LEDGER METHOD AND APPARATUS FOR MANAGING THE DISTRIBUTION OF CONTENT

CROSS-REFERENCE TO RELATED APPLICATIONS

This application is a continuation of application Ser. No. 17/868,642, filed Jul. 19, 2022, which is a continuation of application Ser. No. 16/863,411, filed Apr. 30, 2020 (now U.S. 11,399,058, issued Jul. 26, 2022), which claims the benefit of the following Provisional Patent Application Numbers:
- U.S. Provisional Application No. 62/842,383, filed May 2, 2019;
- U.S. Provisional Application No. 62/842,397, filed May 2, 2019;
- U.S. Provisional Application No. 62/842,408, filed May 2, 2019;
- U.S. Provisional Application No. 62/842,414, filed May 2, 2019;
- U.S. Provisional Application No. 62/842,427, filed May 2, 2019;
- U.S. Provisional Application No. 62/842,446, filed May 2, 2019;
- U.S. Provisional Application No. 62/842,447, filed May 2, 2019;
- U.S. Provisional Application No. 62/842,457, filed May 2, 2019;

and which is a continuation-in-part of the following patent applications which are assigned to the assignee of the present application:
- U.S. patent application Ser. No. 15/933,327, filed Mar. 22, 2018 (now U.S. Pat. No. 10,771,582, issued Sep. 8, 2020);
- U.S. patent application Ser. No. 15/933,330, filed Mar. 22, 2018 (now U.S. Pat. No. 10,904,351, issued Jan. 26, 2021);
- U.S. patent application Ser. No. 15/933,332, filed Mar. 22, 2018 (now U.S. Pat. No. 10,880,394, issued Dec. 29, 2020);
- U.S. patent application Ser. No. 15/933,336, filed Mar. 22, 2018 (now U.S. Pat. No. 10,778,800, issued Sep. 15, 2020);
- U.S. patent application Ser. No. 15/933,338, filed Mar. 22, 2018 (now U.S. Pat. No. 10,911,559, issued Feb. 2, 2021).

TECHNICAL FIELD

The embodiments of the invention relate generally to the field of content distribution over a network. More particularly, the embodiments relate to an immutable ledger method and apparatus for managing the distribution of content.

BACKGROUND ART

Offering WiFi to customers in mobile environments is a necessity for many businesses. For example, many airlines, cruise ships, bus fleets, and train systems offer WiFi to passengers. However, customer expectations are increasingly unattainable given the variable connectivity and minimal bandwidth during transit in these mobile environments.

The average household streams content on multiple devices in the range of 500 GB/month. When travelling, consumers are beginning to expect the same level of network access, which is impractical on current systems given the number of passengers and low bandwidth connectivity in these environments.

BRIEF DESCRIPTION OF THE DRAWINGS

A better understanding of the present invention can be obtained from the following detailed description in conjunction with the following drawings, in which:

FIG. 1C illustrates one embodiment of the invention which includes a capacitor and a content distribution network (CDN);

DETAILED DESCRIPTION

Figure 1A:
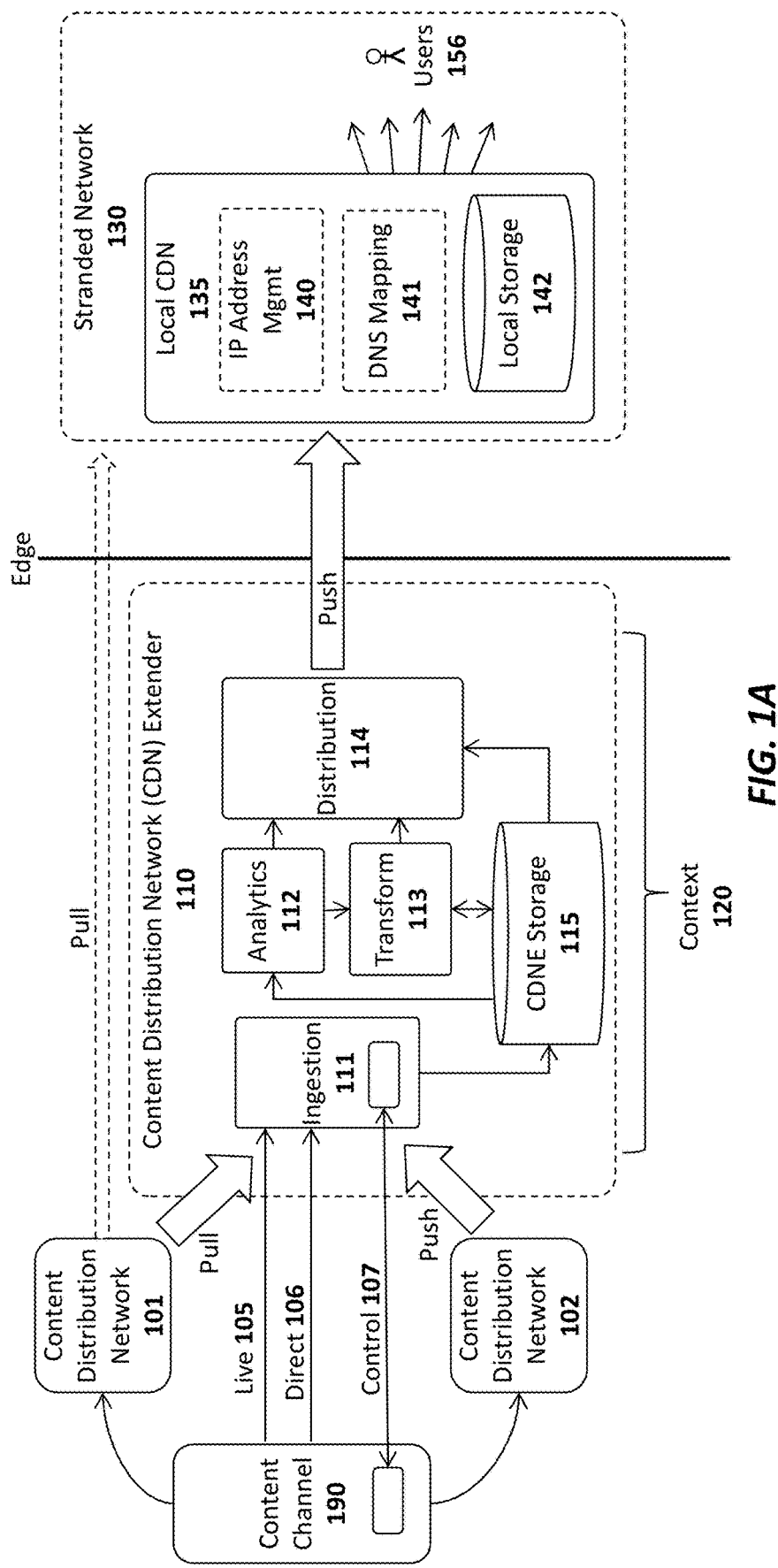
FIG. 1A illustrates one embodiment of the invention for securely and efficiently delivering media content to a mobile environment configured with a "stranded" network.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

The embodiments of the invention meet the expectation of end users to be connected, anywhere, anytime, even in remote locations and on the go where bandwidth has traditionally been limited. In particular, intelligent caching techniques are described which host content at strategic locations. In one embodiment, caching and associated Content Delivery Networks (CDN) solve networking congestion limitations by pre-loading content behind the point of congestion.

Existing caching and CDN technologies require continuous high-speed connectivity to operate correctly, which is not available in mobile environments such as airplanes, trains, buses, and passenger ships. Consequently, these businesses are increasingly disadvantaged, creating pent up demand for a solution within a very large market.

One embodiment of the invention addresses the lack of connectivity available to the mobile environment by augmenting existing connectivity with additional high speed access points at strategic locations where the mobile environment can be anticipated to pause for either deterministic or non-deterministic periods of time. Management of these dual networks, in one embodiment, is provided by an Internet Service Provider (ISP). However, given the focus on large datasets (e.g. Video) this entity is referred to herein as a Content Service Provider (CSP).

In one embodiment, the CSP manages each mobile environment as a connected subnetwork of the aggregate CSP's network. In one implementation, this is accomplished by defining IP subnetworks. In particular, the mobile environment is configured as a routable IP subnetwork that may be reached either through the low speed communication channels (e.g., a satellite link or cellular network connection which is available when the mobile environment is in transit) or the high speed network (e.g., when the mobile environment reaches a strategically located high speed link).

If the mobile environment passes through several locations with high speed networks, in one implementation, it will utilize a routing protocol such as the Interior Gateway Protocol (IGP), to announce that there is a new route to the subnetwork. At all times, a lower priority route is available through the low speed network.

The CSP is will deploy these high speed networks in strategic locations, where the mobile environment is known to pass. The CSP may also ensure that content can be transmitted to the mobile environment when a high speed connection is established. This can be achieved in a number of ways, relative to various aspects of the invention Sufficient connectivity to the edge location+high speed connection can be engineered to ensure data transfers can be made in a timely manner Data can be transmitted to the edge location, and await further transfer to the mobile environment when the high speed connection is established In one embodiment of the invention, an existing Content Provider Cache (CPC) can be hosted by the CSP at a central location, in accordance with the requirements specified by the content provider. By way of example, and not limitation, a Netflix Open Connect Appliance (OCA) may be installed and hosted by the CSP. If the mobile environment establishes a connection to a high speed connection at one or more edges of the CSP network, another cache (e.g., another Netflix OCA) can initiate a scheduled peer fill from the central cache. The peer fill may be either instantaneously scheduled or predictable.

In another embodiment of the invention, an intermediate storage device, sometimes referred to below as a "capacitor" device, retains the data designated for one or more mobile environments. The locally connected mobile environment includes a Content Distribution Node (CDN) that downloads content from the capacitor when in range of the high speed connection.

As discussed below, in certain situations, the CDN node in the mobile environment uploads content to the capacitor. For example, certain capacitors configured in remote locations may lack a high speed link to the CSP network. In such a case, as mobile environments with large CDN nodes come within range (e.g., cruise ships), the capacitor may retrieve as much data as possible from those CDN nodes and subsequently provide that content to CDN nodes of mobile environments. This facilitates the mobile environment as a mechanism of the CSP to distribute content throughout its network and is particularly beneficial for large datasets that take days or weeks to transmit.

The CDN node, in one implementation, is the intermediary to one or more cache types that may be associated with the mobile environment. For example, a Netflix OCA, Google Global Cache (GGC), a Transparent Cache working with content providers, or a more traditional Transparent Cache that simply replicates traffic known to represent desired content. In all cases, the CDN node can allow local copies to be propagated to the mobile environment in a predicable manner, where connectivity is abstracted from the caches. This permits scheduled cache fills from caches such as Netflix and Google; as well as other more flexible mechanisms.

The capacitors of the CSP network host pooled content at rest. In one implementation of the invention, this content may be owned by other parties (e.g. Netflix) and require visibility to where it has been copied and distributed. For example, certain content providers such as Netflix require knowledge of where all copies of content are stored. Each copy distributed by a capacitor to a CDN node, and a CDN node to a cache, may be recorded, such that all storage locations are known and reported back to the content provider. Furthermore, one embodiment provides techniques to purge content when necessary (e.g. killing the cypher used to decode the content).

A. Embodiments of a Content Delivery Network Extender (CDNE)

FIG. 1A illustrates a content distribution network extender 110 (hereinafter "CDN extender" or "CDNE") which includes circuitry and logic to provide content distribution support to stranded networks 130. As used herein, a "stranded network" 130 includes any form of local network (wired and/or wireless) with a concentration of users 152 during certain periods of time and which has a limited backhaul connection to the Internet overlapping with these time periods (e.g., such as in a transportation vehicle). Stranded networks 130 can range from WiFi networks in mobile environments such as a ferry, train, or plane through any concentration of consumers with Wifi/Cellular connectivity and a limited backhaul. Stranded networks 130 are sometimes referred to as being located at the "edge" of the CDN extender 110 networks.

In one embodiment, the CDN extender 110 includes ingestion logic 111 for retrieving content from a content channel 190 and/or one or more content distribution networks 101-102; analytics logic 112 to analyze content usage and related data associated with the current context 120; a transformation logic 113 to perform specified transformation operations on the content as described herein; and distribution logic 114 to intelligently push the original content and/or transformed content to local CDN 135 on each stranded network 130.

In one embodiment, the CDN extender 110, in combination with a plurality of local CDNs 135 configured within stranded networks 130, augments the temporal lack of connectivity with high speed access points positioned at strategic locations which the stranded network 130 is known to enter/pass, either for a deterministic or for a non-deterministic period of time.

In particular, the CDN extender 110 evaluates the current context 120 associated with the content to be distributed (e.g., properties associated with the content) before ingesting 111, applying analytics 112, transforming 113 the available streams and packaging for a deterministic distribution 114.

One embodiment of the CDN extender 110 comprises an intelligent and embodiment of the CDN extender 110 comprises an intelligent and efficient push distribution network which distributes content to a local CDN 135 based on properties associated with the stranded network 130 and properties associated with the content to be distributed. Stranded network properties may include, but are not limited to, the geo-locational schedule of the stranded network 130 (e.g., high bandwidth connection points through which the stranded network 130 will pass at given times), the capacity of the local storage 142 on the local CDN 135, and the manner in which the local CDN 135 manages IP addresses and DNS mappings to its users 156 to implement the techniques described herein.

In different embodiments, the local storage 142 may be managed transparently and/or may be configured as an addressed cache. The IP addressing techniques described herein allow content providers to identify the geolocation of the local storage 142 and can be used to steer traffic for specific consumers/Apps to specific CDNs (including the CDN extender 110).

As illustrated in FIG. 1A, content can either come via CDN partners 101-102 or directly 105-106 from content channels (e.g., Netflix, Hulu). In the illustrated implementation, a bi-directional control channel 107 is established between the content channel 190 and the CDN extender 110, providing the content channel 190 with a high level of visibility into how its content is being stored/used within the CDN extender storage 115 and within the local storage 142 on each stranded network 130. In the other direction, the control channel 107 allows the CDN extender 110 to make content requests/queries based on its continuing analysis and context 120.

As mentioned above, in one embodiment, ingestion logic 111 on the CDN extender 110 pulls/receives content through high bandwidth connections to content channels 190 and/or content distribution networks 101-102. In one embodiment, the ingestion logic 111 stores the content to the CDN extender storage 115, indexing the content as required. The ingestion logic 111 operates based on variables such as consumer feedback (e.g., from stranded networks 130), content provider requirements (e.g., as specified in a licensing arrangement between the CDN extender operator and each content provider), schedules associated with the stranded networks 130, and analytics performed by the analytics logic 112 to create a master content cache. The CDNE storage 115 may comprise a portion of the master content cache or the entire master content cache depending on the implementation. For example, in a small scale implementation there may be a single CDN extender 110 with a single master CDNE storage 115. Alternatively, the CDN extender 110 may be one of several CDN extenders coupled together in a peer-based arrangement and/or a hierarchical arrangement. In the latter case, the master content cache may be arranged at the top of the hierarchy with individual CDNE storage caches 115 of the various CDN extenders 110 pulling from the master cache as needed and potentially sharing the content among other peers (e.g., other CDN extenders) and the various stranded networks 130.

As described below, the analytics logic 112 may evaluate aggregated demand across all edges/stranded networks and prioritizes both the distribution of content and the retention of content based on its analysis. In one embodiment, the analytics logic 112 implements predictive/selective distribution based on a variety of data points which may include, but are not limited to, demographics, geography, destination, edge performance characteristics, and content requirements.

The transformation logic 113 may perform modifications to content under a limited set of circumstances. For example, for extremely popular titles (e.g., identified by analytics logic 112), the transformation logic 113 may generate one or more low bitrate versions and cause the distribution logic 114 to distribute the low bitrate versions to stranded networks 130 with limited storage and/or bandwidth capabilities.

For live content 105, such as a championship football or baseball game, the transform logic 113 may reduce the resolution and/or framerate of the original live stream to generate N low bitrate versions which it may temporarily buffer on the CDNE storage 115. It may then transmit a single stream into each stranded network 130 (rather than a stream per user) to reduce bandwidth consumption.

The distribution logic 114 may then choose from one of the N versions or use the original live content 105 based on the capabilities and other variables associated with each stranded network 130. In one embodiment, the distribution logic 114 generates one or more personalized package variations of the content with a specific stream rate and a customized user manifest to facilitate rapid distribution when the content reaches the stranded network 130.

In various embodiments, the distribution logic 114 may operate in accordance with schedules associated with live content and/or streaming content, schedules associated with each stranded network 130, and/or policies associated with the streamed content (e.g., based on agreements with the content owners or content providers). Some or all of the scheduling data may be determined/managed by the analytics logic 112 and passed to the distribution logic 114.

Various characteristics associated with the stranded network 130 may be evaluated by the analytics logic 112 to control the transmission of content to the local CDN 135. This may include, for example, the volume size of the local storage 142 (e.g., 1 TB, 2 TB, 5 TB, etc), static utilization of the content (e.g., selective prioritization, up to 100% static which would be VOD), and adaptive utilization (e.g., a utilization percentage for each content title, which may be analytics-driven).

Note that the terms "logic," "module," and "engine" are used interchangeably herein to refer to the various functional components shown in the figures (e.g., analytics logic 112). In one embodiment, these components are implemented by program code stored in a memory being executed by a processor to perform the described functions. These functional components may also be implemented in hardware (e.g., application-specific circuitry such as an ASIC), or using any combination of hardware and software/firmware.

One embodiment of the invention includes a system and apparatus for intelligently caching data based on predictable schedules of mobile transportation environments. In this embodiment, content is ingested into the CDN extender, distributed to the mobile environment, and managed on the remote caches, and then made transparently consumable to end user applications.

Figure 1B:
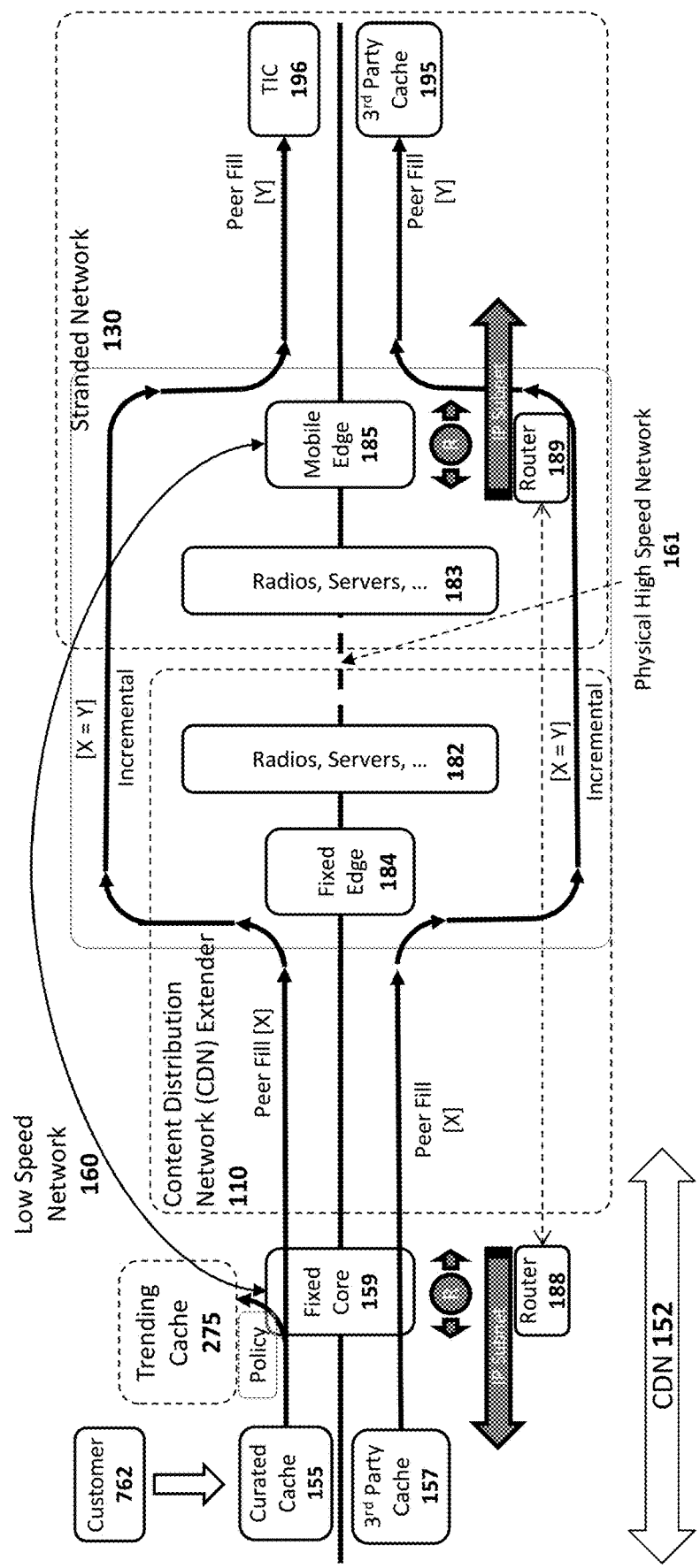
FIGS. 1B-C illustrate embodiments of the invention for connecting a mobile edge device to one or more cache systems.

FIG. 1B illustrates an exemplary embodiment in which a CDN extender 110 operates as an Internet Service Provider for an organization such as a train service, airline, bus service, cruise/ferry service, or any other service which involves a stranded network 130. In certain embodiments described below, the stranded network 130 is integrated on a transportation vehicle. It should be noted, however, that the underlying principles of the invention may be implemented in any form of stranded network 130.

In the illustrated example, the stranded network is configured with a mobile edge 185 which periodically connects to one or more fixed edges 184 via high speed networks 161. Various different types of wireless radios, wired transceivers, protocols, servers, etc. (e.g., servers 182, 183), may be used to form the physical high speed connection including 802.11 protocols (WiFi) and Gigabit Ethernet protocols. When the transportation vehicle arrives or passes by a stationary fixed edge 184, connectivity may be established using different techniques.

In one instance, a cache 155 directly connects to a transparent cache (TIC) 196 in the mobile environment, via a fixed edge 184, high speed network 161, and mobile edge 185. One embodiment relies on scheduled connectivity and sufficient connectivity to complete the cache fill. This is defined by Peer Fill X=Y as indicated in FIG. 1B.

Alternatively, or in addition, a 3rd party cache 157 peers with a connected 3rd party cache 195, via fixed edge 184, high speed network 161, and mobile edge 185. Once again, one embodiment relies on scheduled connectivity and sufficient connectivity to complete the peered cache fill. This is defined by Peer Fill X=Y.

One embodiment comprises a system and apparatus for temporally and spatially aggregating connectivity to a mobile cache. Specifically, this embodiment comprises a stranded network 130 in a mobile environment that may come and go on a non-deterministic basis. A local store is coupled to the stranded network and a novel set of network management operations are implemented to distribute IP addresses in the mobile environment to accommodate the requirements of the various content providers.

Figure 1C:
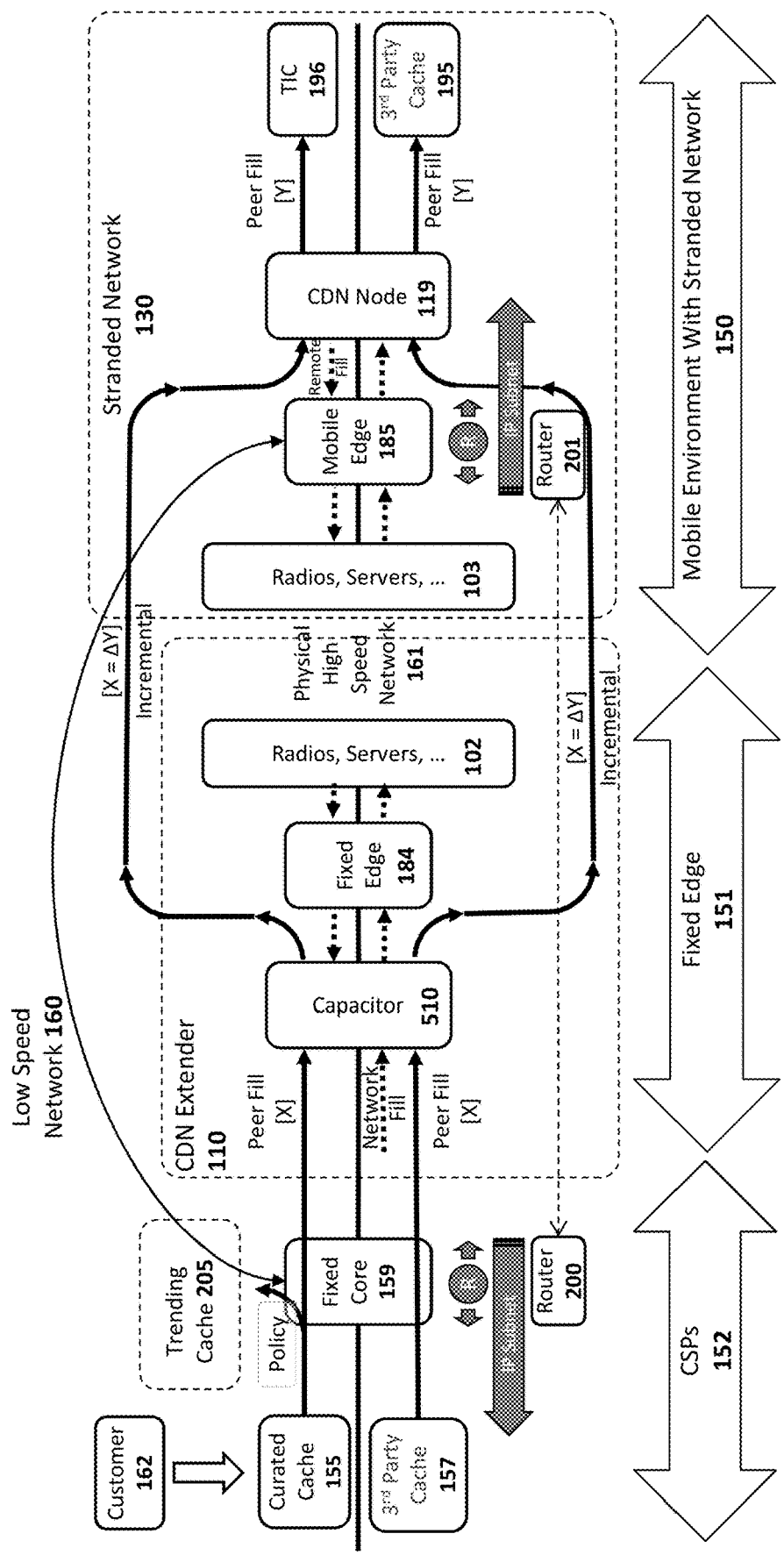

FIG. 1C illustrates an exemplary embodiment in which connectivity is augmented with both a capacitor 510 (at the fixed location) and CDN node 119 (in the mobile environment). In the illustrated implementation, these devices manage the transient nature of high speed network 161, by pooling data within each device. In one embodiment, high speed network 161 may be significantly faster than the network connecting the capacitor 510 to the CSP network 152 via fixed core 159. By storing cache data at the capacitor 510, a-priori, the maximum speed available to high speed network 161 can be achieved, and multiple mobile environments 150 can be concurrently and/or consecutively updated from the same capacitor 510.

For example, in one instance, a curated cache 155 transmits its contents to one or more capacitors 510 in one or more locations. Then as a mobile environment 150 approaches a specific fixed edge 184, the physical high speed network 161 is established under the control of fixed edge 184 and mobile edge 185. The CDN node 119 establishes connectivity with the capacitor 510, and proceeds to download content currently stored on the capacitor 510. The CDN node 119 in this embodiment is responsible for managing incremental downloads. For example, the mobile environment 150, may stop at two or more fixed edges 151 over a period of time. Each stop may only facilitate a partial transfer of data. Upon completion of a full transfer to the CDN node 119, the TIC 196 receives a continuous peer fill from the CDN node 119. This may be defined by the equation incremental Peer Fill X=ΔY.

In one instance, a $3^{rd}$ party cache 157 peer fills its contents to one or more capacitors 510 in multiple locations. Then as a mobile environment 150 approaches a specific fixed edge 184, the physical high speed network 161 is established under the control of fixed edge 184 and mobile edge 185. The CDN node 119 establishes connectivity with the capacitor 510, and proceeds to download cached content stored on the capacitor 510. The CDN node 119 is responsible for managing incremental downloads (e.g., identifying content that it does not have and requesting that content from the capacitor 510). For example, the mobile environment 150, may stop at two or more fixed edges 151 over a period of time and each stop may only facilitate a partial transfer of data. Upon completion of a full transfer to the CDN node 119, the 3rd party cache 195 receives a continuous peer fill from the CDN node 119. Again, this may be defined as incremental Peer Fill X=ΔY.

In one implementation, portions of the curated cache 155 identified as high priority are referred to herein as a trending cache 205. In one embodiment, cache fills from the trending cache 205 are permitted over the low speed network 160 when the high speed link 161 is unavailable (e.g., during transit of the mobile environment 150). By way of example, the data within the trending cache 205 may be the most popular/frequently requested data as determined by the CSP 152. In this implementation, the fixed core 159 permits content from the trending cache 205 to be routed over the low speed network 160 to the mobile edge 185, and through to the CDN node 119. As mentioned, the low speed network 160 may include (but is not limited to) mobile wireless technologies such as satellite, cellular (e.g., LTE), or long range WiFi. From there, a Peer Fill X=Y is completed to TIC 196 and/or $3^{rd}$ party caches 195.

As previously described, in some instances, a capacitor 510 may not have a high speed connection to the fixed core 159. For example, the capacitor 510 may be configured in a relatively isolated location which the mobile environment 150 is expected to pass (e.g., in the middle of a train or ferry route), in accordance with either a deterministic or non-deterministic schedule. In this instance, a connected CDN node 119 may be configured to upload specific cache content to the capacitor 510, via the mobile edge 185, the high speed network 161, and the fixed edge 184. In one embodiment, this is accomplished by the capacitor 510 and CDN node 119 exchanging messages to identify cached content stored on the CDN node 119 but not yet stored on the capacitor 510.

The capacitor 510 may then request such content from the CDN node 119, potentially in a prioritized order based on popularity or a "most frequently requested" value associated with each item of content in the CDN node 119. In this way, the various mobile environments 150 become a distribution network for the fixed edge 184 and vice versa. That is, each mobile environment 150 will provide new data to the capacitor 510 as it passes by and the capacitor 510 may provide content to mobile environments which do not currently have certain content.

In one embodiment, the mobile environment 150 is an addressable extension of the CSP 152. For every established high speed network 161 encountered by mobile environment 150, reachability must be accomplished by ensuring network connectivity. Fixed core 159 provides policy routing to either the low speed network 160 or through to fixed edge 184 and high speed network 161. In the case where high speed network 161 is established, mobile edge 185 communicates back to the fixed core 159 that it is connected and accessible. In one embodiment, this is accomplished by a network router at 201 which issues an Interior Gateway Protocol (IGP) update to router 200 directly associated with the fixed core 159. For example, the router 201 of the mobile environment may provide router 200 with TCP/IP data (e.g., a new TCP/IP address) that router 200 can use to establish a connection to router 201.

One embodiment of the invention comprises a system and apparatus for propagating content throughout a network using a mobile environment. This embodiment leverages the mobile environment to move data throughout the distribution network. For example, a train which picks up new data from one station may deliver the new data to other stations.

B. Propagating Content Through Mobile Environments

Figure 2:
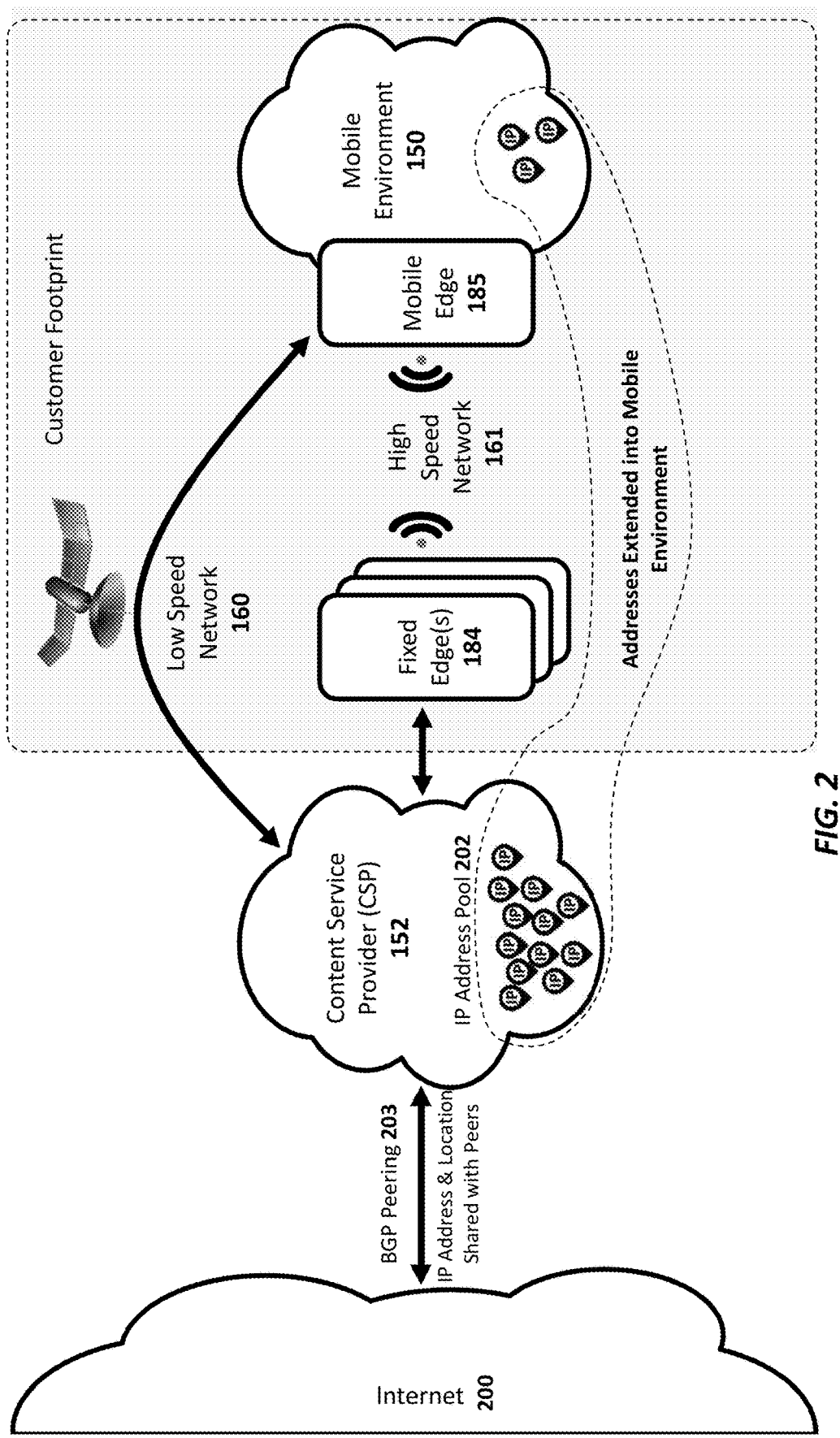
FIG. 2 illustrates additional features including allocating content service provider (CSP) addresses into the mobile environment.

As illustrated in FIG. 2, the content service provider 152 may be allocated a large pool of IP addresses 202, portions of which may be allocated to the various mobile environments 150 (e.g., trains, ships, buses, planes). As mentioned, this may be accomplished by defining a different sub-network for each mobile environment 150 and allocating the mobile environment all of the IP addresses within that sub-network.

In one embodiment, the Border Gateway Protocol (BGP) may be used to exchange routing and reachability information among different network components. For example, in FIG. 2, a BGP peering connection 203 is used to share IP addresses and locations with content providers (e.g., Netflix, Google, Amazon, etc) who require location information related to IP addresses in the mobile environment 150.

Figure 3:
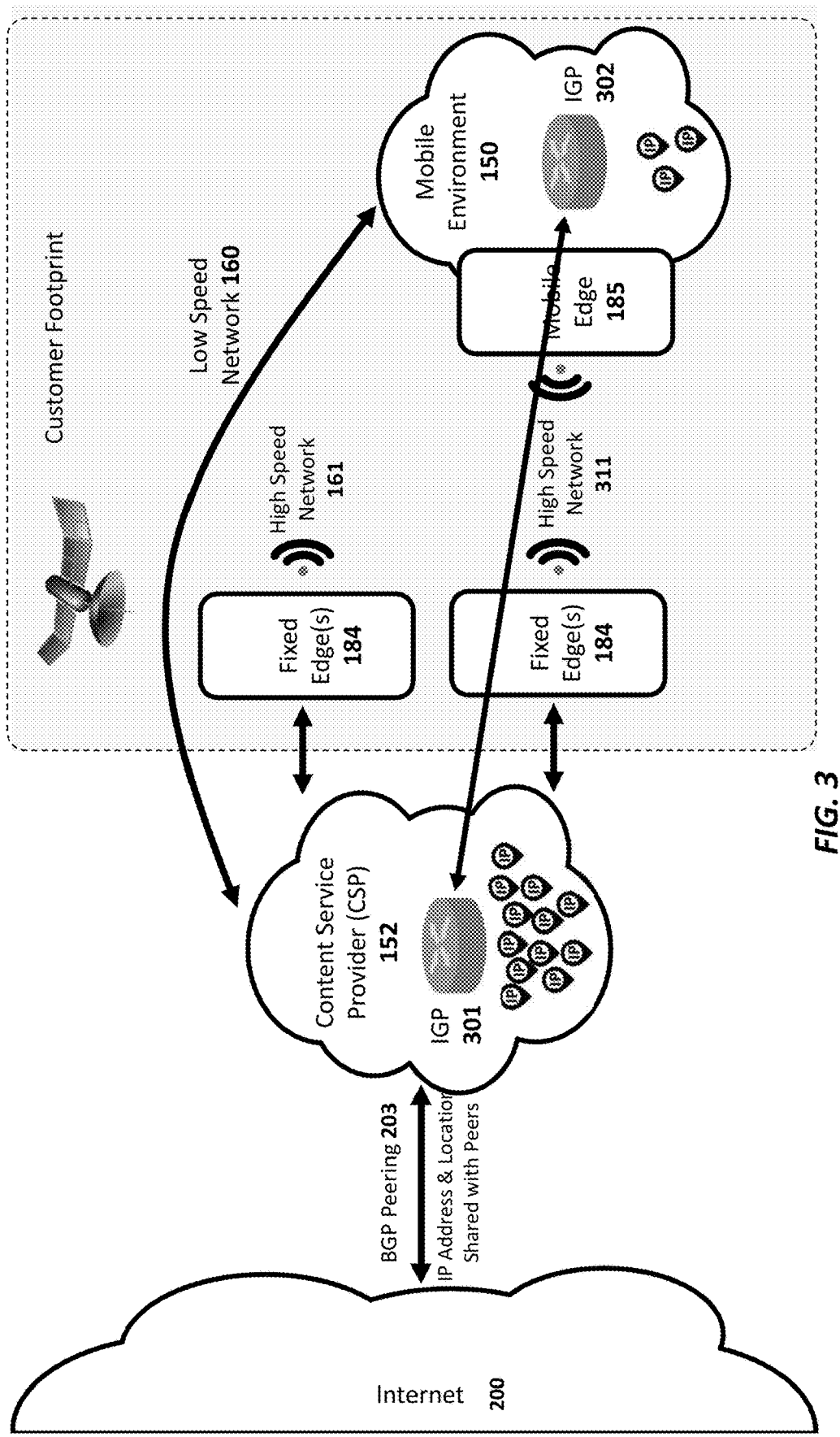
FIG. 3 illustrates additional features including usage of the Interior Gateway Protocol (IGP) and Border Gateway Protocol for managing network connectivity.

FIG. 3 highlights how an IP address in a mobile environment 150 establishes a routable connection back to the CSP 152, even when moving from a first high speed network 161 to a second high speed network 311. In particular an IGP router 302 is aware that high speed network 311 is established, and propagates its local subnetwork information to IGP router 301 within the CSP network 152. Using the updated IGP router 301, the CSP 152 may route packets to the mobile environment 150. Note that prior to the establishment of high speed network 311 (e.g., while the mobile environment 150 is in transit), IP addresses could still be routed through low speed network 160.

Figure 4:
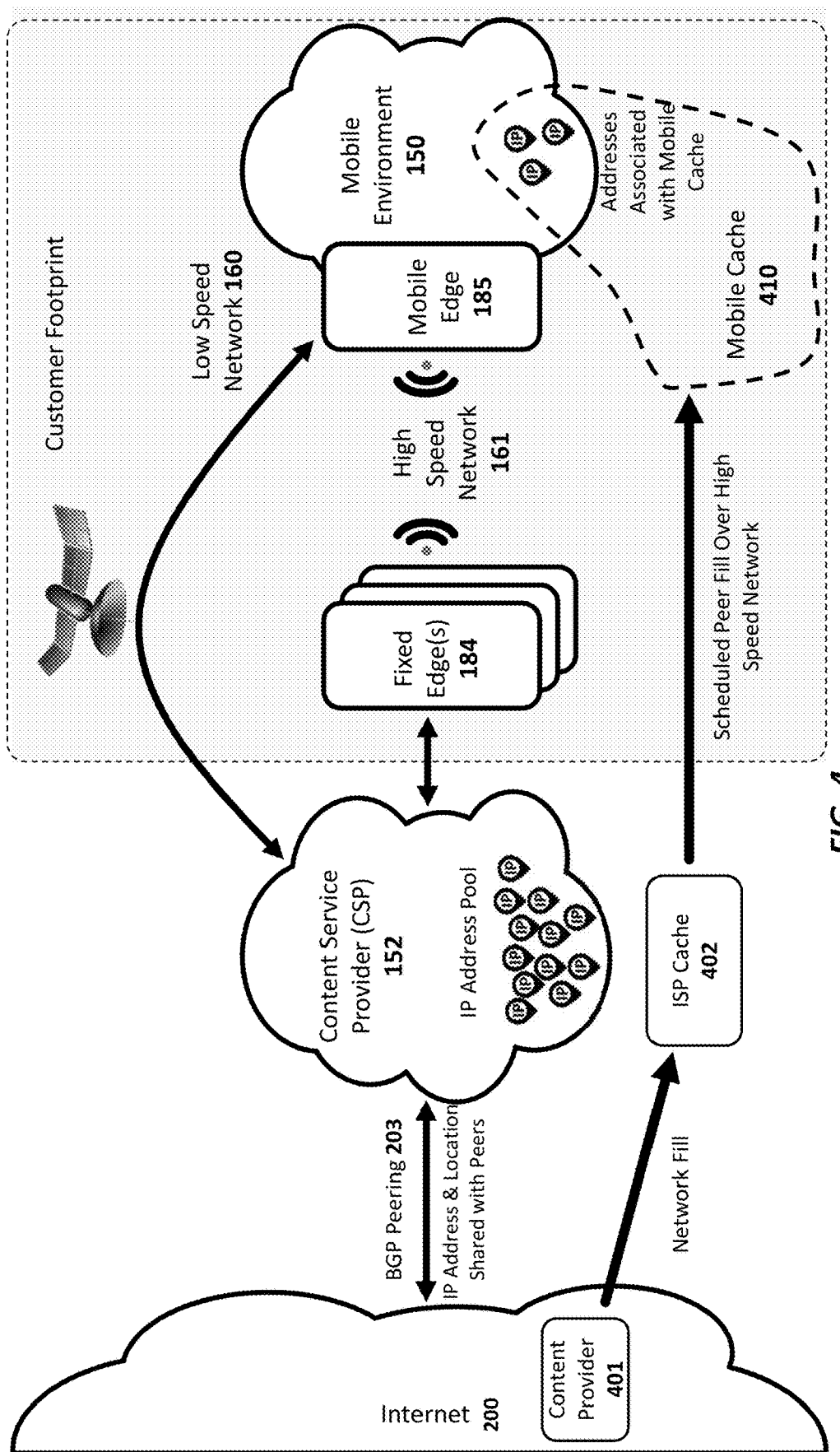
FIG. 4 illustrates one embodiment which includes an Internet Service Provider (ISP) cache to store content service provider content.

FIG. 4 illustrates an example of content cache management in this environment. In this example, a specific $3^{rd}$ party cache 410 is deployed into the mobile environment 150, and is part of the CSP subnetwork (i.e., having an IP address range allocated by the CSP). In one embodiment, the CSP 152 identifies the range of subnetwork addresses within proximity of the $3^{rd}$ party cache back to the $3^{rd}$ party content provider 401 via the BGP Peering link 203. The CSP 152 also deploys a $3^{rd}$ party cache 402 within the CSP 152 to operate as an ISP cache 402. In this embodiment, all updates from the $3^{rd}$ party content provider 401 are made directly to the ISP cache 402 over the CSP network gateway. The third party mobile cache 410 is then updated from the ISP cache 402 upon an event such as a scheduled or unscheduled peer fill over the high speed network 161.

In one embodiment, requests to access content from user devices in the mobile environment 150 may initially be routed to the content provider 401 over the low speed network 160. As a result of the BGP peering connection 203 which provides network connectivity information to the content provider 401 as described above, the content provider 401 redirects the user devices to the mobile cache 410 (assuming it contains a copy of the requested content). Redirection by the content provider also requires that the user authenticate with the content provider 401 to receive authorization to render the requested content. In one embodiment, following authentication, the content provider 401 will perform a lookup of the location of the user (e.g., with the BGP peering data) and see the association between the user's IP address and the mobile cache 410 (which are in the same sub-network). Subsequent communication may then be directed to the mobile cache 410.

Figure 5:
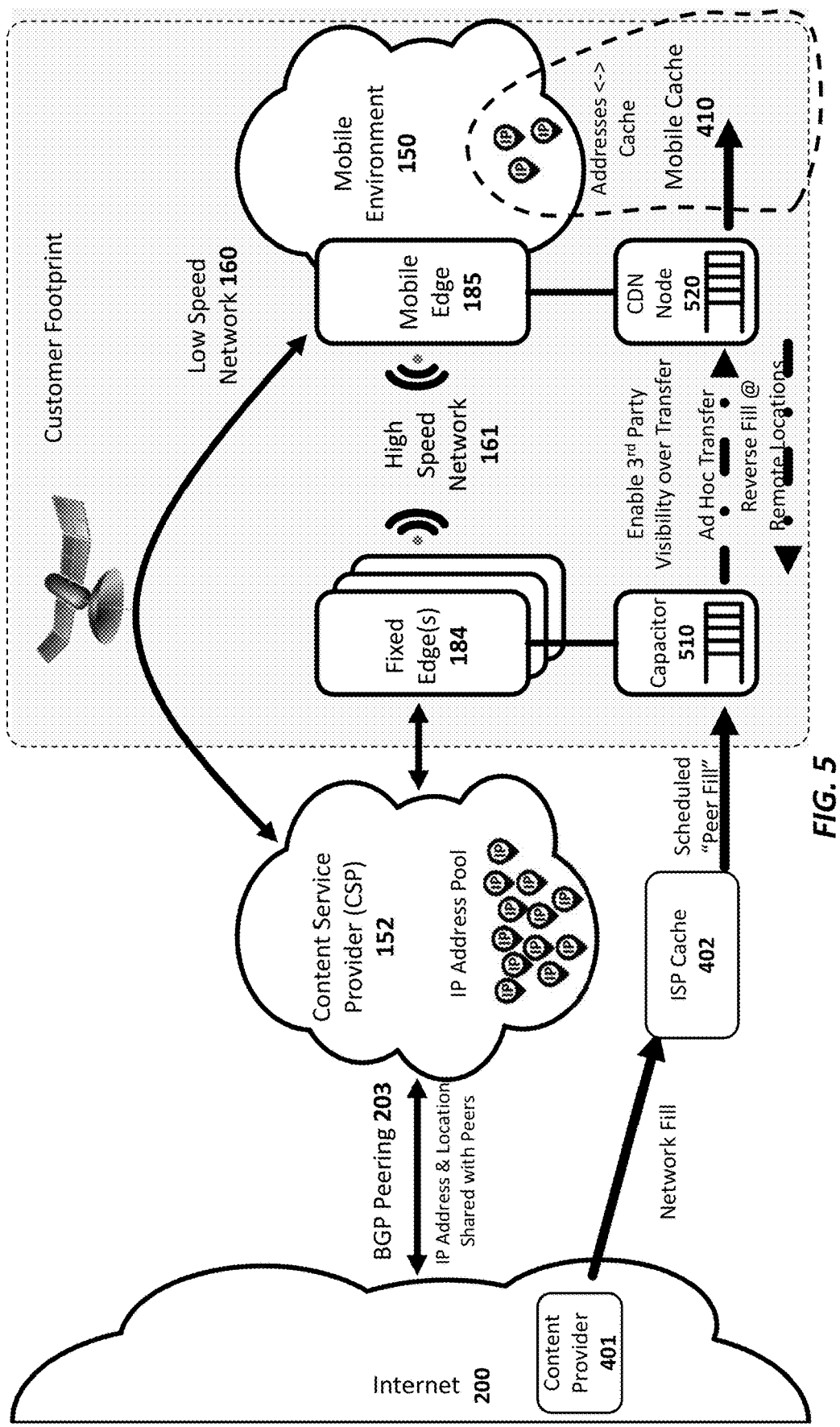
FIG. 5 illustrates additional details for one embodiment including a capacitor and CDN node.

FIG. 5 illustrates additional details of one embodiment which includes a capacitor 510 and CDN node 520 (e.g., which operate generally as described with respect to FIG. 1B). In the illustrated example, content provider 401 network fills are pushed out to one or more ISP caches 402. The ISP cache 402 then performs scheduled peer fills to each capacitor 510 at a fixed edge 184. When the high speed network 161 is established at a particular location (e.g., train/airport/bus/ship terminal), the capacitor 510 forms a connection with the CDN node 520 and provides content to the CDN node 520 over the high speed link 161. As mentioned, the capacitor 510 may send the CDN node 520 a list of the content it has available and the CDN node 520 may compare this list against its existing content. It may then request all (or a subset) of the content that it is not currently caching locally. Alternatively, the CDN node 520 may transmit the capacitor a list of its content and the capacitor may perform the filtering operation to identify content required by the CDN node 520. In either case, the list of content needed by the CDN node 520 may be prioritized based on variables such as popularity, content size, etc. This will ensure that the content most likely to be needed in the mobile environment 150 has been transferred from the capacitor 510 to the CDN node 520 (i.e., in cases where the high speed network 161 is only available for a limited time).

In addition, as mentioned above, a reverse fill operation may be performed in some instances where a capacitor 510 has a relatively low bandwidth link back to the ISP cache 402 and/or content provider 401 (e.g., if the capacitor is in a remote location). In such a case, when a CDN node 520 on a cruise ship, for example, forms a high speed connection with the capacitor 510, it may perform a reverse fill operation to provide the capacitor with content for the duration of the connection. The capacitor 510 may then provide this content to other CDN nodes for other mobile environments 150.

Figure 6:
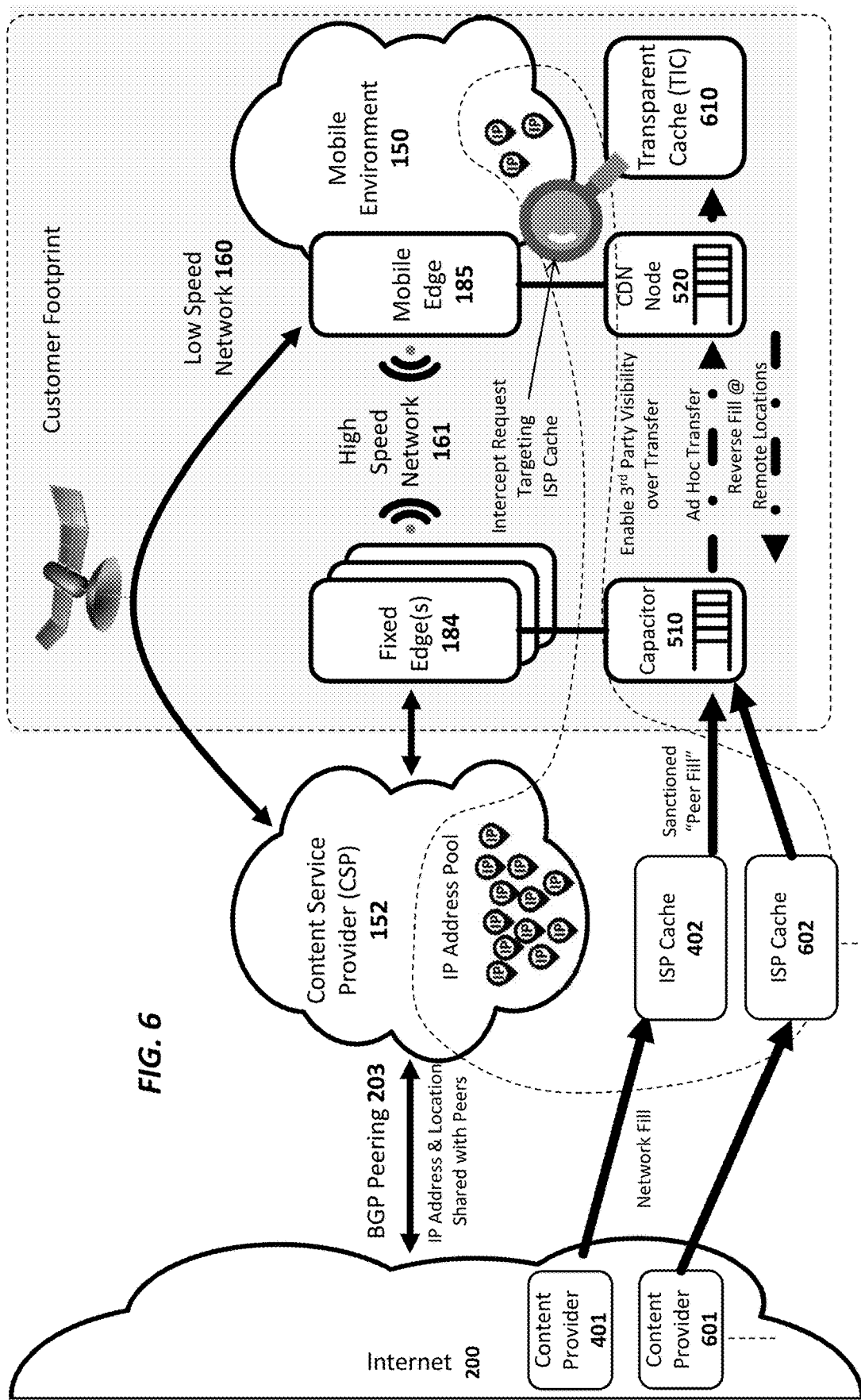
FIG. 6 illustrates one embodiment including a transparent cache (TIC)

FIG. 6 illustrates another embodiment which utilizes a transparent cache 610. One benefit of the transparent cache 610 is that it may be configured as a composite of multiple caches from multiple different content providers 401, 601. The additional content providers 601 may interact with the system in the same manner as described above for content provider 401 (e.g., performing a network fill operation on ISP cache 602). This embodiment addresses a problem for markets where the mobile environment 150 is not of a significant size to warrant full third party/content provider caches. For example, an OCA cache from Netflix will support as much as 80 Gbps of streaming traffic which is excessive for a bus or plane environment. Moreover, a content provider such as Netflix might not deploy such a device in a mobile environment of under 100 or even 500 users.

In an embodiment where the content of the ISP Cache(s) 402, 602 can be trusted to be hosted on the transparent cache (TIC) 610, then the TIC 610 may have a full representation of the ISP cache 402, 602. A "Sanctioned Peer Fill" refers to the ability for an ISP cache 402, 602 to share its contents with a TIC 610. The capacitor 510, high speed network 161, and CDN node 520 operate as described above to distribute the content. The TIC 610 of this embodiment has an easier job identifying which requests are to be intercepted. For example, when a user in the mobile environment 150 requests content from a third party content provider 401, 601 (e.g., Netflix), a request is made to the content provider 401, 601 over the internet 200. The content provider returns a reference to its ISP Cache 402, 602, respectively, rather than one physically located in the mobile environment 150. In this embodiment, the IP addresses within the mobile environment 150 are not distinguished. The BGP peering connection 203 announces ALL addresses of the CSP 152 to the Internet, including the content providers 401, 601. Furthermore, the closest cache will be the ISP caches 402, 602. Thus the user device will attempt to connect to an ISP cache 402, 602 and the transparent cache 610 only needs to see this destination address and it can safely intercept, redirect and service the request from its local copy of the content.

Figure 7:
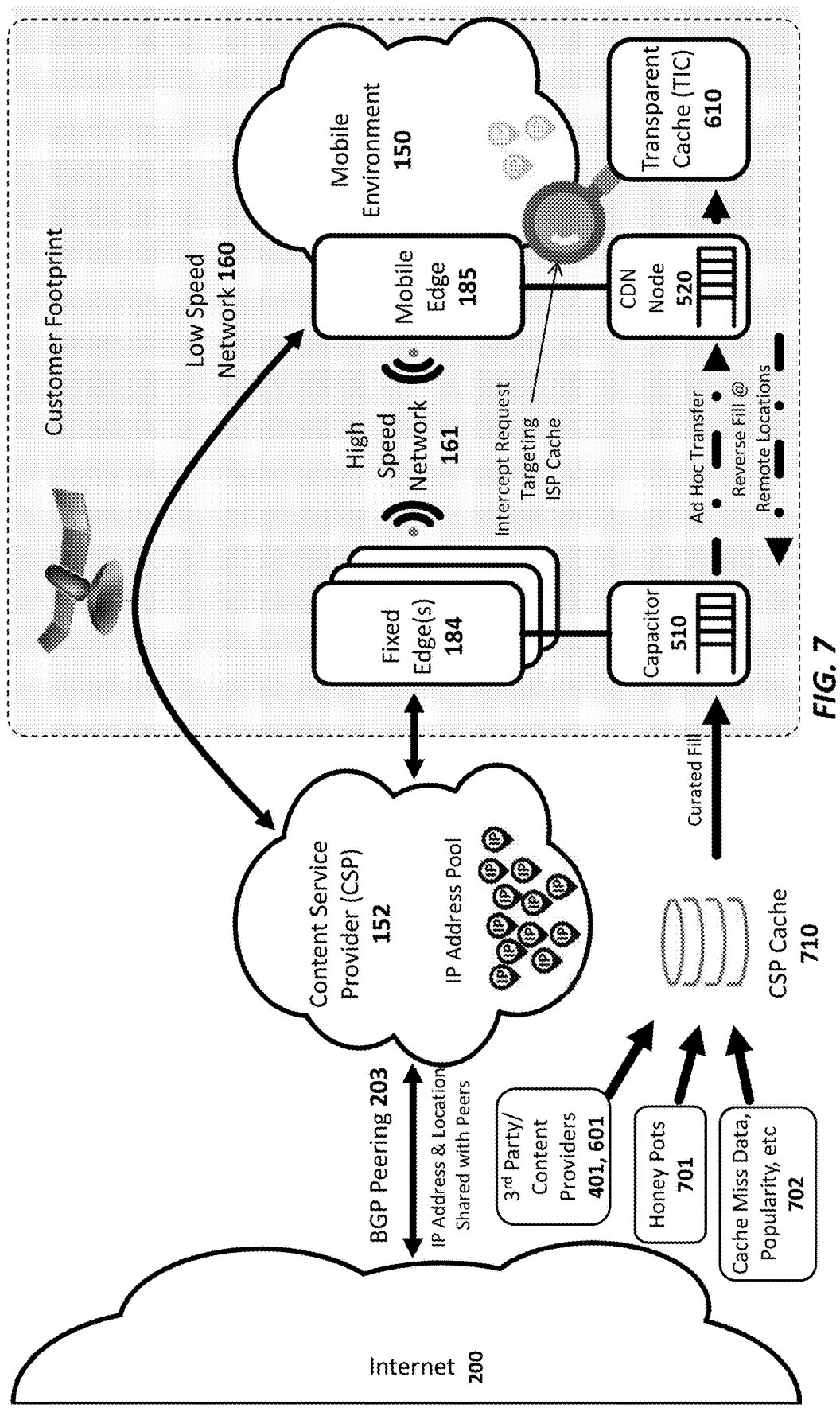
FIG. 7 illustrates one embodiment in which a CSP cache stores content from a variety of sources including content providers.

In the embodiment illustrated in FIG. 7, a curated CSP cache 710 stores data from multiple content providers 401, 601 in accordance with cache fill policies. The cache is curated to the extent that a specific set of rules/policies are used to determine which content to store. For example, to render caching decisions, data 702 such as cache miss data, popularity data, etc., may be gathered from each of the transparent caches 610 deployed in the field. In addition, data 701 may be collected from honey pots configured in strategic network locations on the Internet and designed to observe user trends. Other variables may be factored into the caching policy including, but not limited to customer requests (e.g., requests from a content provider 401, 601 to cache certain items of content).

C. Embodiments of a Transparent Cache

One embodiment of the invention comprises a transparent cache system and method for transparently caching multimedia content from multiple content providers. This embodiment implements caching of content from multiple content providers and distributing the content as a single solution to the mobile environments 150.

Figure 8:
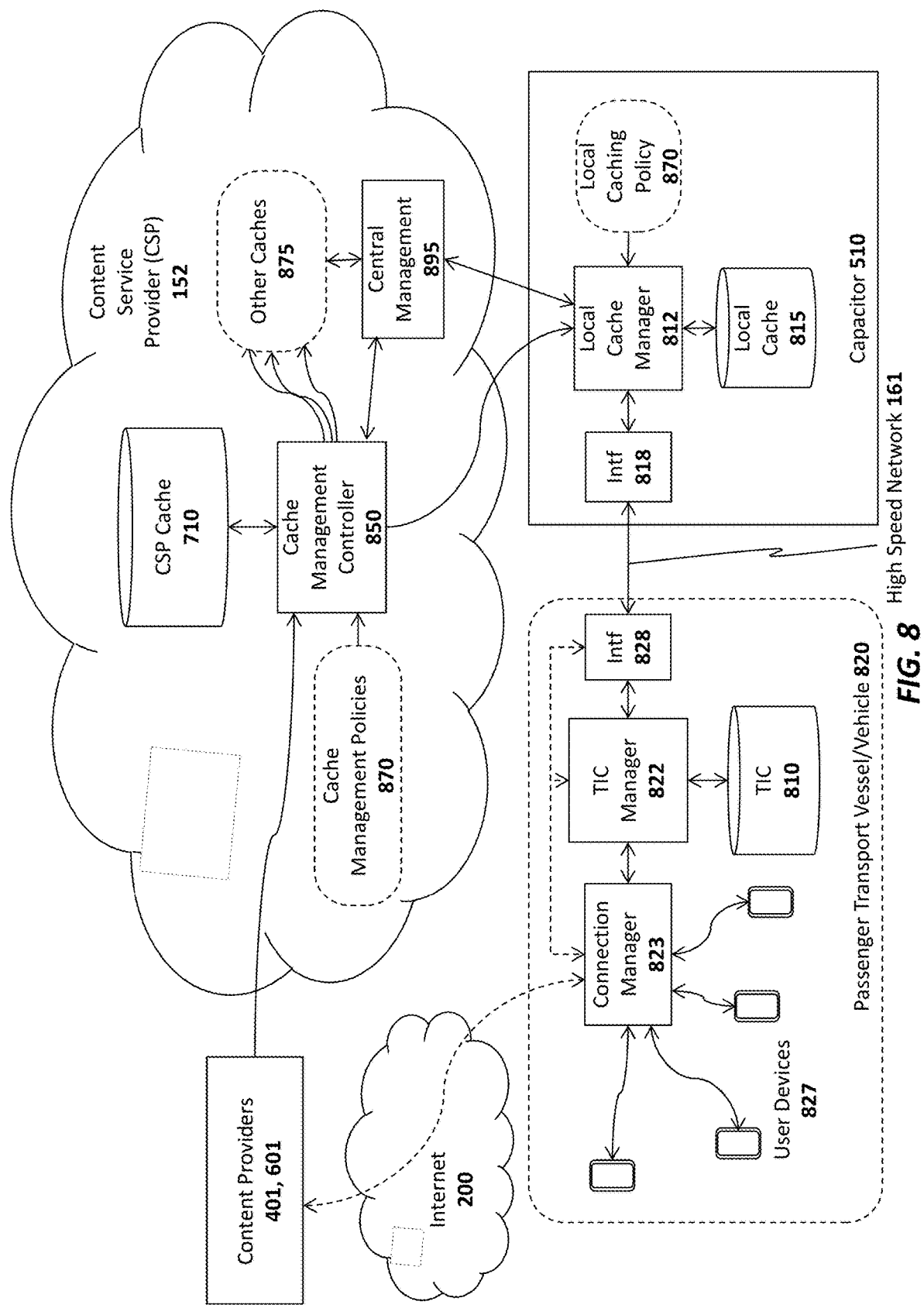
FIG. 8 illustrates additional details of one embodiment of the invention.

FIG. 8 illustrates one embodiment in which a central cache management controller 850 managed by the CSP 152 renders decisions on which particular content to store from each of the content providers 401, 601 (e.g., based on cache miss variables, content provider preferences, and/or other variables discussed above). In addition, the cache management controller 850 determines when and how to fill content to each of the capacitors 510 based on specified cache management policies 870. For example, cache management policies 870 may indicate a particular speed at which local caches 815 are to be filled and/or a particular time period during which the local cache fills are to occur (e.g., in the middle of the night when bandwidth is available). The cache fill policies 870 may be specified by feedback from user requests and/or the content providers 401, 601 (e.g., Netflix). For example, if a particular video is being viewed frequently by users then the cache fill policy 870 may specify that the cache management controller 850 should fill all local caches 115, 175 with this particular video.

In one embodiment, one or more content providers 401, 601 periodically (e.g., nightly) fill one or more CSP caches 710 with specified content. This may be done, for example, with the most popular multimedia content (e.g., the most popular movies and TV shows). The cache management controller 850 then fills the local caches 815 at various capacitors 510 via communication with corresponding local cache managers 812. In one embodiment, each local cache manager 812 may implement its own local caching policy 870 for establishing communication with TIC managers 822 of different transportation vessels/vehicles 820 to fill the respective TICs 825 with content. In one embodiment, the interfaces 828, 818 comprise high speed wired or wireless links (as described above with respect to high speed network 161) which operate at maximum capacity (e.g., 30 GB/s, 100 GB/s, etc.) as soon as the transportation vessels/vehicles 820 arrive or pass by the capacitor 510. By way of example, and not limitation, the stationary content distribution location where the capacitor 510 is configured may be a train station, bus terminal, cruise ship port/terminal, or airport terminal/gate. In addition, in certain embodiments described herein, capacitors 510 are strategically positioned at locations along the known path which will be taken by the various transportation vessels/vehicles 820.

In one embodiment, a user device 827 on the passenger transport vessel/vehicle 820 will initially establish a local wireless connection with a connection manager 823 on the passenger transport vessel/vehicle 820 (e.g., on the plane, train, etc). Once connected, the user device 827 may request content from the content provider 401, 601, for example, by logging in to Netflix and attempting to stream a particular movie. If a connection over the Internet 200 is available, the content provider 401, 601 may receive the request, identify the user device 827 as operating within the content distribution network of the content service provider 152 (e.g., identifying this based on the dynamic network address assigned to the user device 827), and transmit a redirect message, instructing the user device 827 to connect to the CSP cache 710 (e.g., a Netflix OCA cache). Upon attempting to access the content from the CSP cache 710, the connection manager 823 and/or TIC manager 822 may determine that the requested content is cached locally within the TIC 810 and redirect the request to the TIC 810.

The user device 827 then streams the content from the TIC 810 over the local wireless connection provided by the connection manager 823 (e.g., a local WiFi connection). As such, even if the passenger transport vessel/vehicle 820 is out of range of the Internet 200 (e.g., on a cruise ship at sea, a train travelling through the mountains, etc), user devices 827 can still access authorized content locally. Alternatively, if the Internet connection 200 is available, only the initial user requests and/or user authentication may be transmitted over this link (relatively low bandwidth transaction) but the content will be streamed from the local TIC 810.

Note that the TICs 610 described above may include any or all of the components shown in FIG. 8 including a TIC manager 822, a physical TIC cache 810 and potentially also a connection manager 823 and high speed interface 828.

Embodiments of the invention include a system and apparatus for implementing a high speed link between a mobile cache and an edge cache, potentially using different communication protocols and/or techniques to establish secondary connectivity between the mobile cache and edge cache.

D. Implementations of a High Speed Link to a Mobile Environment

Figure 9:
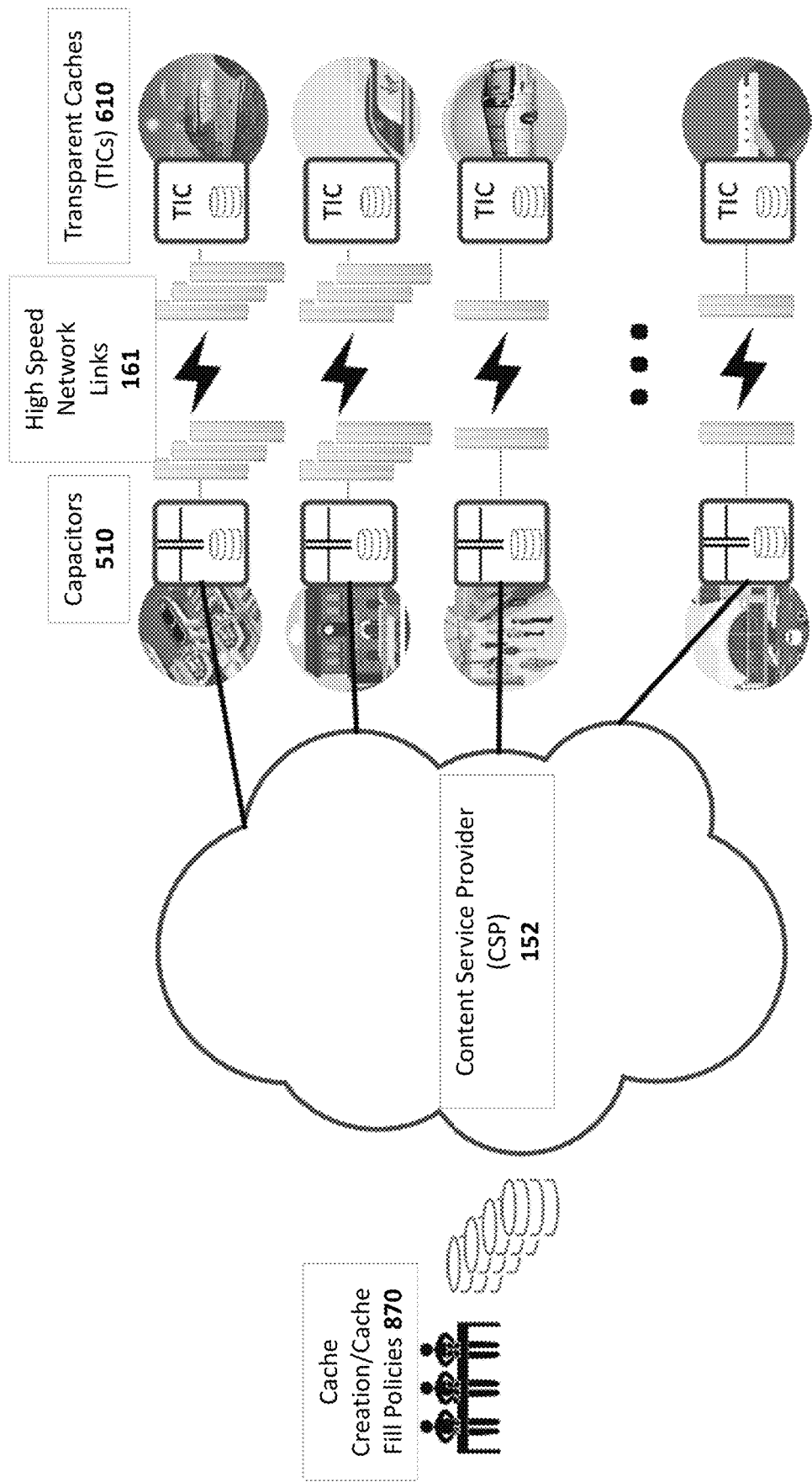
FIG. 9 illustrates interaction between capacitors and TICs in one embodiment.

FIG. 9 illustrates an arrangement in which multiple transparent caches (TICs) 610 configured within different types of transportation vessels/vehicles are periodically updated over high speed network links 161 established with a plurality of capacitors 510. As mentioned above, the content service provider 152 fills the caches at each of the capacitors 510 in accordance with a cache fill policies 870. For example, the cache management controller 850 may distribute content in response to content usage data received from the content provider and/or from the individual TICs 610. In this embodiment, the TICs 610 may monitor content usage throughout the day and report usage statistics back to the cache management controller 850. The cache management controller 850 may then uniquely tailor the content for each individual capacitor location and/or each individual TIC.

As mentioned, the content service provider 152 may deploy high-speed networks and capacitors 510 at numerous strategic locations for the customer and/or specific industries. Each of the capacitors 510 will be updated from the central cache management controller 850 via a cache distribution network as described above. It is important that all of the relevant capacitors 510 have consistent data, so that each vessel/vehicle 820 can consistently request data whenever connected.

In one embodiment, the various TIC components described above are deployed on the transport vessel/vehicle 820 as a network appliance with a memory for storing program code and data, a processor for executing the program code and processing the data, and a mass storage device to implement the TIC storage such as a set of one or more hard drives. One or more other network interfaces may also be included and used when the vessel/vehicle 820 is in transit (e.g., a satellite service, cellular service, long range WiFi, etc). The appliance may have different shapes, sizes, and capacities. Because the goal is to have a common cache database for all appliances, storage performance will significantly differ between deployments (e.g. a $1000 per 30 TB storage array may be sufficient for 50 streaming sessions, while a $10,000/30 TB storage array may be needed for 1000 streaming sessions).

In one embodiment, the appliance may be deployed in a single or multiple physical components. In one extreme, the appliance is a single server, while in another, it is a rack of servers. This is because the core functions of the TIC can be delineated as a) management functions, b) cache storage management, c) packet interception/flow redirection, and d) serving video requests from clients (via redirect). As a result, the entire functionality could be included within a single server; or it could be delineated/scaled by one or more servers per function. The underlying principles of the invention are not limited to any particular arrangement.

Figure 10:
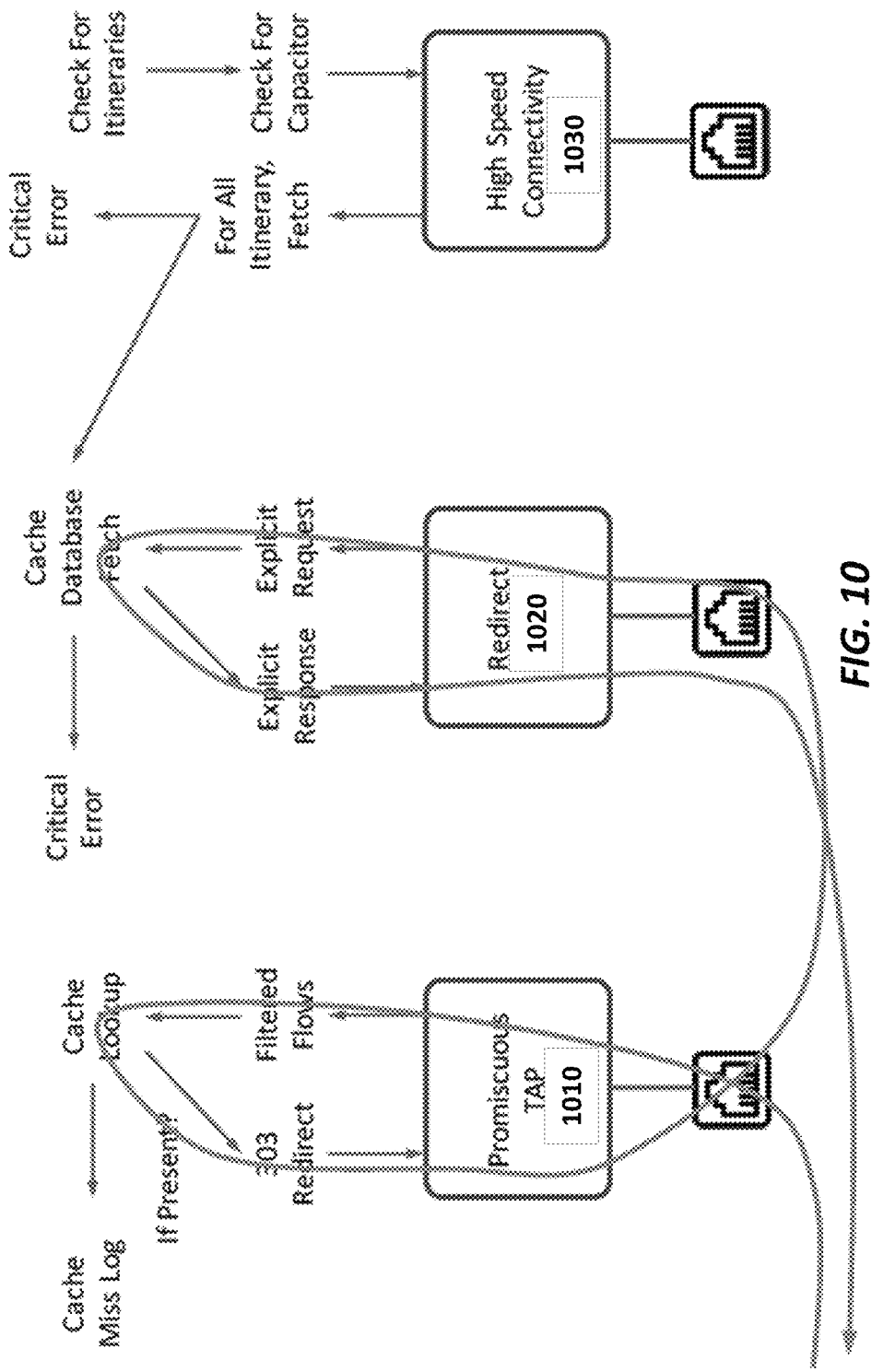
FIG. 10 illustrates one embodiment for redirecting client requests to a local cache.

FIG. 10 provides an overview of an example transaction through one embodiment of the connection manager 823 of a TIC 610. A promiscuous terminal access point (TAP) 1010 monitors packet/flow on the network, and after some analysis, a positive lookup into the cache triggers a redirect (1003). The client then re-requests the content from the local redirect http server 1020, which serves the content from the local TIC 610. In one embodiment, the connection manager 823 monitors the high-speed connectivity via interface 828 out-of-band, and proceeds to download cache updates where and whenever possible.

One requirement for the TIC is that it is part of a managed service. Ideally, the customer simply plugs it in and turns it on. As a result, one embodiment of the system addresses all operational elements autonomously via a central management component 895. For example, each installation may connect to the central management component 895 which provides a host of provisioning functions for new installations. In one embodiment, the management component 895 uses a Linux command line, with additional services being invoked and added as necessary.

Some example functions of the central management component 895 include software updates, notifications to network operations users and/or customers, health monitoring including functions to report on CPU, memory, storage, and network utilization, and LAN management tools to determine how many devices are streaming and how the LAN is performing (e.g., to identify bottlenecks).

Referring again to FIG. 10, one embodiment of the promiscuous TAP 1010 uses an Ethernet port running in promiscuous mode. In this embodiment, access to an Ethernet LAN segment is provided over which all traffic traverses. The promiscuous TAP 1010 listens to all traffic, but filters out any traffic not associated to relevant web requests.

In one embodiment, the promiscuous TAP 1010 uses a Data Plane Development Kit (DPDK) library for managing packets to perform functions such as a 5-Tuple Hash to delineate flows, timestamp and maintain packet order, and support for hardware assistance. In this embodiment, packets read from the promiscuous port are classified, timestamped, and either dropped or scheduled within a FIFO for processing. A multi-threaded architecture may be employed.

In one embodiment, once a hashed stream has been identified, the URI is extracted and checked against the TIC database. If there is a match, then both source and destination points of stream are reset with a FIN packet. But first, the source of the request is sent an HTTP 1003 redirect back to the appliance. Load balancing may also be performed. The redirect may, for example, implement a round robin load balancing, or a single interface may be managed by a load balancer, with multiple servers load balanced behind it.

In one implementation, an efficient "Cache Information Base" CIB is maintained with mirrors the actual TIC database to allow efficient determination as to whether a requested entry exists locally. When a TIC is loaded onto an appliance, the various functions will need to lookup content quickly. In one embodiment, packets destined for the appliance (e.g. management and redirected cache hits), are forwarded to the Management Function or the TIC—essentially, they are ignored by the promiscuous TAP 1010.

Assuming wireless technologies are used for the high speed links 161, a standard MIMO implementation with an 80 Ghz band will achieve 655 Mbps. A 4×MIMO might achieve 2.4 Gbps. 24 Ghz and 60 Ghz radio equipment can also considered. Products exist with 2.4 Gbps in the 24 Ghz spectrum, and 6-10 Gbps radios in the 60 Ghz band. In all cases, link aggregation may be used to aggregate multiple wireless connections (leveraging GPS synchronization, frequency spacing, and signal isolation) to multiply this number. Conceivably this could provide throughput in the 10-50 Gbps range.

Figure 11:
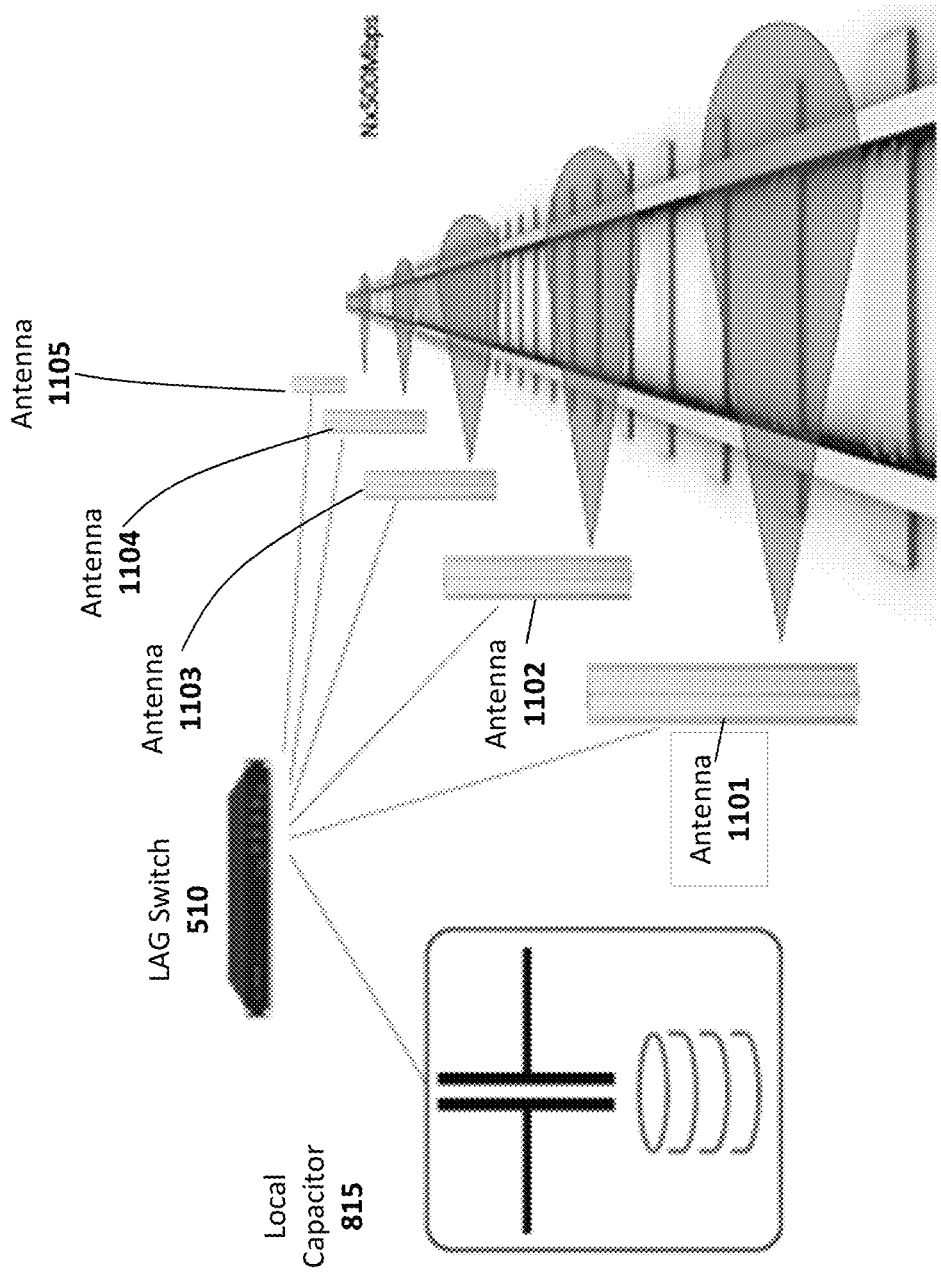
FIG. 11 illustrates an exemplary embodiment with multiple antennas to provide content to a TIC on a train.

As illustrated in FIG. 11, in one embodiment, each stationary content distribution location, such as a train station, airport terminal, bus depot, or cruise terminal has multiple antennas 1101-1105 aligned to the vessel/vehicle entering the station/terminal. One or more capacitors 815 are coupled to the multiple antennas 1101-1105 via a LAG switch. The multiple antennas will transmit content from the local capacitor 815 concurrently over the multiple links, potentially achieving N times the bitrate of one wireless link, where N is the number of antennas.

While a train implementation is illustrated in FIG. 11, similar arrangements may be configured for ships, planes, and buses. Certain implementations may not be able to accomplish the same connectivity aggregation (e.g. only support one radio connection). Nonetheless, 2.5 Gb/s may be achieved for a single antenna solution, which should be sufficient if the vessel/vehicle is stopped at the location for a sufficient period of time. In any case, partial updates to the TIC may occur each time the vehicle/vessel stops near or passes by another capacitor (e.g., at each train station).

Figure 12:
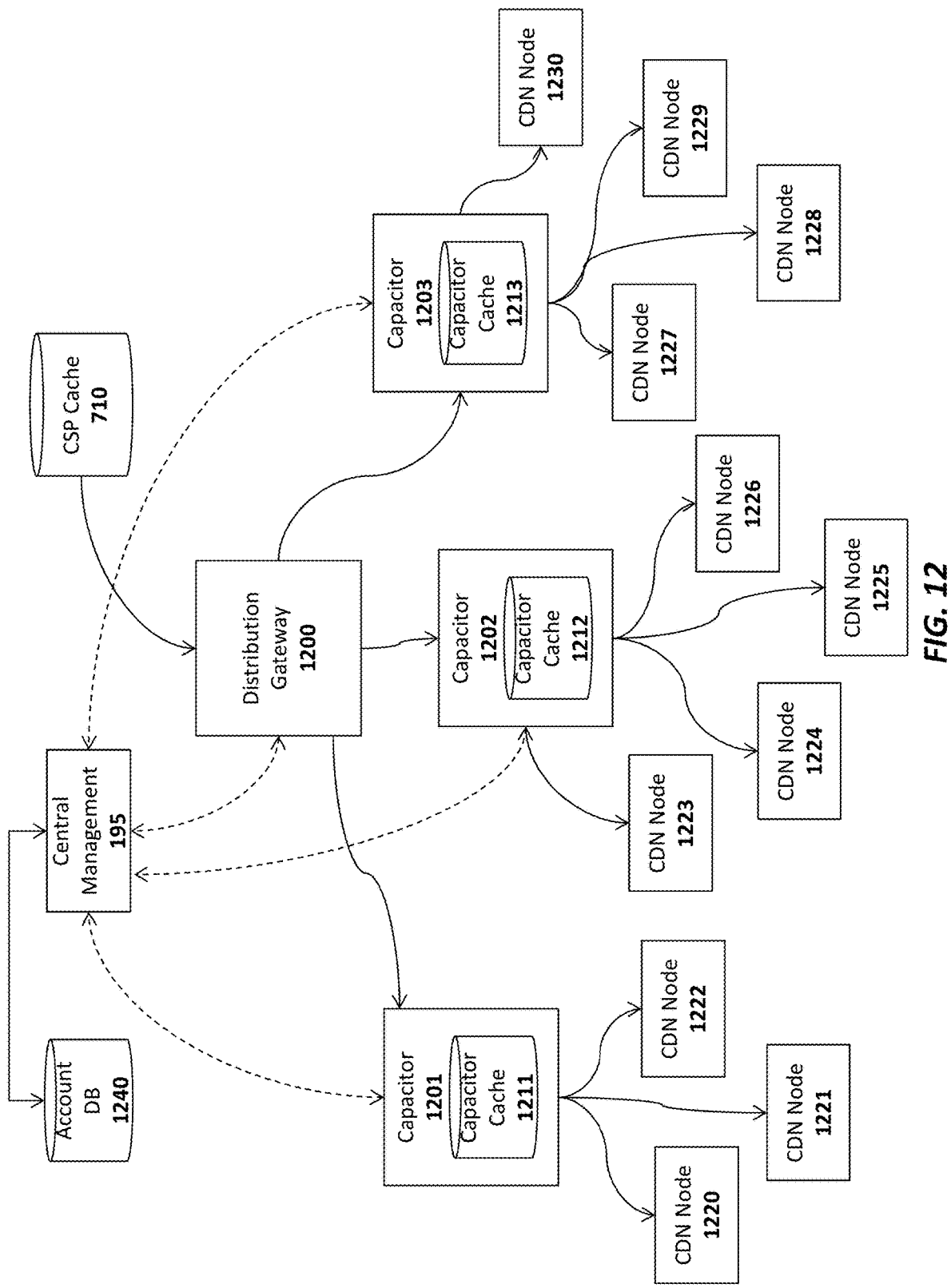
FIG. 12 illustrates one embodiment of a hierarchical arrangement for propagating content.

As illustrated in FIG. 12, one embodiment includes one or more distribution gateways 1200-1203 which are repositories for content to be pushed to the capacitors 1201-1203. Each distribution gateway (DG) 1200 may be set up regionally (e.g., west coast, east coast, Midwest, etc). When a capacitor 1201-1203 is initialized, it will attempt to register with the DG which is closest to it (e.g., the west DG if it is in California). These regional DGs may be identified through DNS scoping (e.g. a capacitor 1201 may connect to a Vancouver-based DG vs. a New York DG because of the proximity).

In one implementation, the DG may simply be an API to a CDN network such as CloudFront's or Akamai's. Ultimately each DG is provided data from the CSP cache 710 which capacitors 1201-1203 will request/have pushed. Given the size of the cache datasets, efficiencies such as Multicast may be used to stream content through the cache hierarchy.

In one embodiment, all capacitors 1201-1203 in the field will register to a DG 1200. Some exchange of dataset inclusion should scope what data needs to be sent to a specific capacitor 1201-1203. When new data is curated at the CSP cache 710, each DG 1200 will initiate a transfer to its registered capacitors 1201-1203. This may be implemented as a push or pull transaction (or both). Scheduling requirements on each capacitor 1201-1203 may play a role in the specific push/pull configuration. In one embodiment, the capacitors 1201-1203 are notified when new content is available, and must then request the data.

In one embodiment, each capacitor 1201-1203 is a server with sufficient storage to retain multiple cache datasets (or a single master cache dataset, from which near derived datasets can be created). The primary purpose of the capacitors 1201-1203, is to have as much data as possible at the high speed network edge. It may receive requests from a single or concurrent CDN Nodes 1220-1230 (and/or TICs), and is able to fill the available Pipe(s).

When a CDN Node 1220-1230 (and/or TIC) connects to a capacitor 1201-1203, it identifies itself, and requests an itinerary of recent updates. The CDN Node may identify itself, for example, based on the vehicle/vessel, customer ID, etc. Based on this, the capacitor 1201-1203 services the CDN Node 1220-1230 with appropriate itineraries specific to the device. The CDN Node will then evaluate the itinerary, comparing it to what it currently has downloaded, and what still needs to be downloaded. It will then proceed to request specific elements from the capacitor 1201-1203.

In one embodiment, a capacitor 1201-1203 will include at least 30 TB of storage, with a read speed of at least 10 Gbps, but preferably 50 Gbps. The internet interface is minimally a 1 Gbps connection, but the actual Internet connection should be at least 100 Mbps. The High Speed network interface must be at least 10 Gbps, but preferably 40 Gbps (4×10 Gbps or 1×40 Gbps). These interfaces will connect to the single or array of link-aggregated high-speed links described above. In addition, a capacitor 1201-1203 may initiate connectivity back to the central management component 895 for management purposes. In one embodiment, the central management component 895 supports operations, administration, maintenance, and provisioning (OAMP) functions.

In one embodiment, each capacitor 1201-1203 will declare its inventory assets, provisioned location, etc, and may request the identity of all anticipated customers and/or corresponding CDN nodes that may come into the vicinity of the capacitor 1201-1203. For example, in one embodiment, the central management component 895 maintains an account database 1240 which identifies all CDN nodes/TICs and associated customers and an association between those CDN Nodes/TICs/customers and one or more capacitors 1201-1203.

In one embodiment, should an unexpected CDN Node/TIC attempt to register with a capacitor 1201-1203, an error is reported to the central management component 895 which will have the ability accept or deny the CDN Node/TIC. If accepted, the capacitor 1201-1203 records and accepts this action persistently (e.g. it does not need to be provisioned again).

Based on all the known customers/CDN Nodes/TICs that will come into the vicinity of a capacitor 1201-1203, the capacitor may request the current list of itineraries and cache datasets (individual or master), as well as any other customer-relevant information. The capacitor 1201-1203 may also register for update notifications, so when the central management component 895 and or curated cache includes new information, it can be pushed to all capacitors 1201-1203 as needed. In one embodiment, scheduling may also be employed so that when a capacitor receives a notification, it will not be acted upon until a designated time (e.g., 2 am). In one embodiment, a proxy device may be configured to imitate the presence of a CDN Node/TIC, and orchestrate the capacitor 1201-1203 as if it were connected in a standard mode of operation.

The capacitor 1201-1203 will wait for registration requests from the high speed network (e.g., for a ship, bus, train, or plane to arrive). When a request is received and validated, a download service will be started for the remote CDN Node/TIC to download new content. Essentially, once authorized, the download can be implemented in a similar manner as an FTP service. The structure of the cache dataset should be considered as tuple sets and blocks of tuple sets. The CDN Node/TIC knows what it has received at other locations, and is responsible maintaining continuity between download sessions. The capacitor 1201-1203 in this implementation may simply be responsible for making the tuple sets available to the CDN Node/TIC.

The capacitor 1201-1203 should be capable of handling more than one TIC at a time. Clearly different capacitor configurations will have different limitations, in terms of concurrent download sessions. The primary limitation will be the network capacity available. In a scenario where many CDN Nodes/TICs may be making concurrent requests, a rack of servers all connected to a single storage array and high capacity switch may be employed, where each server supports 2 or 3 download sessions. In aggregate, the rack can handle 100's of sessions.

In one embodiment, a Point to Point/Multi-Point High Speed Network is used. The vehicle/vessel may connect to a point-to-point radio, or a multi-point radio. They key differentiation is that large datasets are transmitted between the two points. If two or more vehicles/vessels connect to the same access point, the overall throughput will simply be reduced. As in the above example, the fastest transfer rate would be approximately 10 hours for 10 TB. This would be doubled with 2 concurrent transfers.

In one embodiment, the radios will initially connect based on a well known SSID and WPA2/PSK. When the Vehicle/Vessel station comes within range, the wireless link is established. In one embodiment, the Vehicle/Vessel station will be configured as a DHCP client. The access point, or the capacitor behind the access point will provide a DHCP server. Configured within the server will be common DNS entries. For example "capacitor.netskrt.io" will resolve to the local IP address.

In one embodiment, the CDN Node/TIC 610 may either constantly poll the capacitor 510, independent of the High Speed link status (e.g. if it can poll the capacitor 510 on a specific port, then it must therefore be connected) or the TIC can make API calls to the station radio to determine if/when the link is present. The advantage to the latter solution is more deterministic behavior vs. timeouts that could be tied to diverse reasons. The disadvantage is that a hardware abstraction layer may be needed to address changing technologies. Once the connection to the capacitor 510 is established, the TIC 610 will proceed with its Cache Update process described above. Of course, the underlying principles of the invention are not limited to the particular manner in which the connection between a capacitor and TIC is made.

The Point to Point Array High Speed Network exists for an array of wireless connections to be link aggregated between the Vessel/Vehicle and the terminal where the capacitor 510 resides (as described above with respect to FIG. 5). The advantage of this approach is that 10 or 20 high speed connections may be established. If each connection were to achieve 2.5 Gbps, this would generate 25 to 50 Gbps High Speed Links. From a theoretical perspective, a 10 TB cache dataset 725 would be transmitted in approximately 30-60 minutes; or a 30 TB cache dataset 725 2-4 hours; depending on the number of elements within the array.

This solution will work particularly well with "long" vessels/vehicles, such as Ships and Trains. Shorter vessels/vehicles may not provide enough separation between radios to permit multiple connections that do not interfere with each other at a wireless level.

The concept of an array, requires a series of radios to be placed on the side of the Vessel/Vehicle. Therefore, in one embodiment, they are consistently spaced at the terminal. So when the train or ship docks, it will be perpendicularly aligned with each corresponding radio. A 30-45 degree sector might be appropriate to allow some play (e.g. ship might be 10' off the ideal, but still captured by the width of the corresponding radio).

If each radio has the same SSID, but only supports Point-to-Point connections, then once it is connected, the subsequent radios will need to connect to another available SSID. If the Vehicle/Vessel parked and then turned on its radios, this works well. However, if the radios connected while the Vehicle/Vessel came to a stop, then it might result in sub-optimal radios retaining their connections.

For example, if a ship has radios s1, s2, s3, s4, and s5 and when the ship comes into port, radio s1 establishes a connection to corresponding port radio p5. As it moves forward, it loses this association and connects to p4, p3, and p2. When finally at rest, it may not shift to s1, resulting in a sub-optimal connection of s1-p2, s2-p3, s3-p4, and s4-p5. Neither s5 or p1 connect. One solution is to have each radio with a pre-ordained SSID mate such that both s1 and p1 have "Netskrt-1" as their paired SSID.

In one embodiment, the management component 895 is used to deploy a capacitor 510. When the capacitor 510 is activated, it registers itself with the management component 895, which in turn adds it to the database 640 and begins monitoring it for health. If a customer logs into the portal 741, they will see the presence of the capacitor 510 and its current status.

Updates may be pushed to the capacitor 510 via the management component 895 which may also provision various capabilities, monitor the attached High Speed Network, and perform other standard OAMP functions. The management component 895 determines all known cache datasets appropriate for the capacitor 510. Moreover, the management component may set a schedule for the capacitor 510 which may be specified via the operator portal 740 and/or customer portal 741.

In one embodiment, the management component 895 is used to deploy new CDN Nodes/TICs 610. When the CDN Node/TIC 610 is activated, it registers itself with the management component 895, which in turn adds it to the database 640 and begins monitoring it for health, cache content, and connected state. The CDN Node/TIC 610 may be provisioned to be in a monitoring mode, or as an active cache. The management component 895 can push cache provisioning updates to appropriate capacitors 510, that in turn will trigger an action on target CDN Nodes/TICs 610s when them come into range.

In one embodiment, the CDN Node/TIC 610 is configured to have a GPS location which is reported back to the management component 895 periodically. One embodiment allows the system operator and/or the customer to track the location of the CDN Nodes/TICs. Each CDN Node/TIC 610 may also report on its operational status on a periodic basis including data such as cache hits, misses, and monitoring status. These updates may be reported through capacitors 510.

New cache datasets may be generated on a regular basis. At a scheduled point in time, each customer cache update will be scheduled for the appropriate capacitors 510 and transmitted. The mechanism for the packaging a cache dataset is currently contemplated to be a single Master cache dataset, with Itineraries associated to each Customer/CDN Node/TIC. The customer may can log in through a web portal and augment the management policies 870 associated with its itineraries. For example the customer may select geographic, language, or distribution stream specific content.

As described above, a trending cache is a special type of push operation which may be implemented on the low speed network link. This cache is either auto-generated based on specifications from the customer or from other sources (e.g. the content provider itself). A limit may be placed on the cache dataset size. Scheduling data may also be necessary for its distribution and can be set by the customer through their portal. Current News feeds need to be distributed in a timely manner. Either direct to the TIC or on mass via capacitors.

One embodiment includes an operator portal with a hierarchical GUI to view all customers currently active. When a single customer is selected the GUI will display customer details; the total number of customer specific capacitors; the health of the capacitors; the current active cache dataset; the number of CDN Nodes/TICs connected currently, last hour, last day, last week, etc; an error log for the capacitor; the High Speed Network, CDN Nodes/TICs, etc.; the total number of cache dataset transfers to capacitor; and the total number of cache dataset transfers to CDN Nodes/TICs. Additional information which may be hierarchically displayed includes, but is not limited to:

Total number of customer CDN Nodes/TICs
Location of each TIC
Current state of TIC
Total amount of traffic generated by the TIC
Total number of Cache Misses by the TIC
Number of cache dataset 725 updates by TIC
Mean time to update for cache dataset 725
Number of capacitors 510 visited by the TIC
Maximum number of devices connected to TIC
Mean number of devices connected to TIC
Journey data, correlated to statisCDN Nodes/TICs
Total number of cache dataset 725*s*/Itineraries
Usage metrics on cache dataset 725*s*/Itineraries.
Efficiency of Cache Distribution (e.g. we ship 4 cache dataset 725*s* for every 1 downloaded).
Effectiveness of the cache dataset 725*s* relative to other customers/CDN Nodes/TICs (e.g. Dataset 3 has a 20% hit rate for this customer, while every other customer has a 60% hit rate for the same Dataset).
Customer Portal Activity/History. When the customer screws things up, need to be able to check the history of the provision requests made by the customer. Where, what, when type of data. Possibly have the ability to roll back changes.

Thus, the embodiments of the invention contemplate the deployment of caches into mobile environments with various levels of connectivity, including predictable connectivity and unpredictable connectivity. In one embodiment, the system operator is an ISP on behalf of customer who have mobile environments such as trains, planes, buses, and passenger ships.

One embodiment of the system associates a subnetwork of public addresses to the different mobile environments (i.e., different vessels/vehicles) and peers with content providers using BGP (or other protocol). The system associates the different subnetworks with deployed caches so that the content providers can direct client devices to the local cache.

The client device connects to the content provider on either network link and predictable connectivity is defined by time and location. If the mobile environment is in a specific location where a high speed connection can be established for an extended period of time, on a deterministic periodic schedule, then its connectivity is predictable.

One embodiment of the system schedules cache fills with the content provider during these scheduled periods, because connectivity speeds can be guaranteed to meet the requirements of the content provider. While the figures show a single curated cache 155, one embodiment includes at least one cache per content provider, to enable cache fills to peer from. One embodiment provides connectivity to each high speed network, back to the content cache that is used for peering Thus, the embodiments of the invention extend the concept of an ISP to include special connectivity to mobile environments that otherwise would not qualify as a) ISPs, and b) connected locations qualified for cache fills. These embodiments also uniquely enable existing mechanisms to localize to mobile environments by controlling IP addressing, distribution, and connectivity back to the content provider. In addition, the embodiments uniquely define a dual homing connection to enable both at en-route and at rest connectivity to fulfill unique aspects of the cache life cycle.

As mentioned, in some embodiments, caches are also deployed into mobile environments with nonpredictable connectivity—i.e., where the high speed connectivity is not predictable form a time or location perspective. For example, a cruise ship that travels from Vancouver to Alaska may stop at several ports over the course of several days where a cache fill may be implemented. The duration of time may differ from location to location, making it difficult for the cache to be completely filled at one stop. Thus, the cache may be incrementally updated at each stop, where the high speed link speed from shore to ship is set as high as possible to minimize the time needed.

One embodiment employs a capacitor and a CDN node to manage the nondeterministic nature of the high speed network. The capacitor is a storage facility with one network connection that is used for cache distribution, and one network connection to the high speed connection that is used to forward content to the mobile environment. The CDN node is within the mobile environment and has one connection to the high speed network, and one connection to the mobile environment. Its responsibility is to fully receive a cache update from one or more capacitors over one or more locations and over discrete periods of time. When the content has been aggregated together, the CDN node can fulfill a scheduled cache fill with the local cache device. The local content cache believes it is operating on a consistent schedule, even though it took several stops of the mobile environment to complete.

Many capacitors can be deployed at many locations and trickle fed with cache content over lower speed network connections for cost effectiveness. Thus, there is a relationship of many mobile environments to many capacitor locations. Transient connections fulfill the mobile environment cache updates. Once the cache is updated, the address domain of the cache informs the content provider which cache serves which clients.

Thus, the embodiments of the invention uniquely enable environments that cannot deterministically meet the requirements of a cache deployment by aggregating connectivity over a period of time and space, to shift the requirement of update to the local mobile environment. If sufficient connectivity events can be guaranteed between a periodic cycle to aggregate content into the local environment, then the local cache can fulfill its cache fill requirements without realizing that it does not have a limited connection. Multiple caches from multiple content providers can be satisfied by these techniques.

One embodiment deploys CDN Nodes/TICs that serve content caches in a highly scalable implementation. Building on the above implementations, the number of caches may begin to become uneconomical to deploy because (1) existing caches are targeting 10's of Gbps of streaming traffic; and (2) IP addressing is used to direct end user devices to the appropriate cache.

A transparent cache (TIC) that contains the content of one or more content caches can address these issues. For example, a single transparent cache may utilize the high speed network mechanism described above to retain a current cache for multiple content providers. Moreover, with the ISP model, a single addressable cache may be identified to handle and entire address domain of users. For example, thousands of end user devices could all be associated with a single cache and the logistics shared with the content provider via BGP. With the system herein operating as the ISP, 100's of transparent caches may be deployed that would intercept traffic targeting the advertised case (thus locally intercept the requests). These transparent caches then scale well beyond the existing mechanisms. In addition, because the ISP provides a single transparent cache for multiple content channels, economies of scale can be achieved across multiple content channels, making the solution viable.

Peering with specific content channels would implement content and security certificates. If Netflix permitted the transparent cache to be deployed with content that is equivalent to a CPC and, as reported, TLS encryption may be used for content distribution. As a result, Netflix signed certificates would be needed to intercept and serve up intercepted requests. If the same content sanctioned from Netflix is used, as in the upstream CPC, then any request to that CPC is a valid cache hit. Every flow initiated to the known CPC may be intercepted, followed by a 303 redirect to the device and service the request locally. The redirected request establishes a TLS session with the transparent cache, which is fulfilled by a Netflix certificate, thereby providing Netflix a level of control over the distribution of their content. Locally stored content, which is distributed with content provider (e.g., Netflix) permission, may now be served up to the client devices. A number of constructs could be introduced to ensure Netflix or other content owners can verify how content has been accessed will outside of their scope of explicit control.

In a pure transparent cache environment, where cache data is curated in one geography and deployed in another geography there is a requirement to understand what requests are collectively the same. For example, there are more than 6500 CPC caches deployed globally. Conceivably every transparent cache that is in a mobile environment will need to consider all 6500 addressable points to verify if a request is for a locally-stored segment of content. One embodiment crawls the internet for cache addresses, and provide lists of addresses for comparison. Another embodiment applies contextual information of the location of the transparent cache (or the mobile environment on which it resides) to determine which CPC cache addresses are likely to be considered.

If the operator of the above system is the ISP of record, either explicitly, or through overlay networks, the target cache addresses can be narrowed to those provided by the operator.

Given the nature of the transient high speed/permanent low speed links described above, one embodiment of the invention evaluates the urgency or importance of specific content and, in some instances, uses the low speed link to fill the TIC. The portion of the TIC containing this urgent/important content is referred to herein as a "trending cache."

One embodiment allocates a certain percentage of low speed bandwidth to the trending cache to allow high-demand data to be filled into the trending cache all the time. In some instances, all or a significant percentage of the low speed bandwidth may be temporarily allocated to fill the cache with a particular multimedia file which is being frequently requested.

One embodiment uses the mobile environment to propagate content throughout the network. In certain embodiments described above, capacitors may be deployed in far away places that do not necessarily have decent high speed connectivity. For example, if a 100 Mbps link is the maximum a remote port to a capacitor can support, then a 30 TB fill would take approximately 28 days. in contrast, a 15 Gbps link could make the transfer in under 5 hours. Consequently, one embodiment establishes high speed connections with passing vessels/vehicles whenever possible to download content from the temporary caches over a high speed link. For example, the capacitor may retrieve content from a temporary cache on a ship that is travelling over the course of a day to another port. Then the temporary cache on another ship travelling in the reverse direction could update sooner from the remote capacitor.

Thus, the capacitor includes two modes of operation. It would always have a broadband connection, but maybe <1G would be a maintenance connection and >=1G would be cache fill connection. If only a maintenance connection exists, the capacitor is filled over the WAN. If a cache fill connection, the capacitor would not be fully filled over the WAN.

One embodiment of the capacitor will only retrieve data from the passing vessel/vehicle which is more recent than the data it is currently storing. For example, if the capacitor only needs image A, then it will only retrieve image A from the passing vessel/vehicle. In contrast, the temporary cache on the vessel/vehicle may have out of date copies of images B and C, in which case it will retrieve them from the capacitor.

For example, the maintenance connection may be used to distribute metadata regarding the current cache datasets. Image A, B, C are considered current, and the capacitor should have them. When a CDN node connects with the local high speed network, the following protocol may be invoked:

CDN Node—do you have A, B, or C?
  Either start downloading, or continue downloading from wherever the CDN Node previously stopped filling.
  If capacitor doesn't have A, B, or C, don't do anything
Capacitor—do you have A, B, or C?
  If yes, capacitor either starts downloading, or continues downloading from the connected CDN Node.
  If capacitor already has A, B, or C, or CDN Node doesn't have either, don't do anything In one embodiment, the cache fill connection is used to both distribute metadata and the actual datasets. Depending on the speed of the link, and/or the availability of content, reverse filling from a temporary cache on a vessel/vehicle may make sense.

A 30 TB fill would still take 3 days on a 1 Gbps connection. If a ship showed up with a full link, and 50% was downloaded on the WAN, it makes sense to calculate what percentage could be downloaded on the 15 Gbps link, while its available. One embodiment of the capacitor operates according to a set of rules/policies. For example, one requirement might be that the capacitor is to download 1-50% on the WAN, and concurrently download 51%-100% on the high speed connection in reverse order. Then determine when the whole cache has been completely downloaded.

Other implementations may download some percentage (e.g., half) when the high speed link is available. If complete, download half of what is still left. If complete, download half again (similar to a binary search algorithm). The cache of one embodiment is downloaded in segments and any random point in time may result in the link being lost. Therefore, one embodiment includes checkpoint circuitry/logic to checkpoint the downloads (i.e., to restart or continue as permitted).

Globally, one embodiment tracks all of the capacitors, and all vessels/vehicles that may intersect with them. By performing analytics, it may be determined how long it takes for all capacitors to come up to date. With a sufficient number of high speed network connections any capacitor or any size could be refilled within 1-2 days.

Consequently, using the techniques described above, the vessels/vehicles become a mobile portion of the network and are used to propagate updates to remote network components (i.e., remote capacitors).

In the existing ISP partner program, cache providers such as Netflix and Google, allow their own property to be hosted by ISPs. Using various mechanisms, the ISP can manipulate some of the logistical aspects of the deployment, but ultimately, the only place the ISP sees content is on the wire. It is only stored within the over-the-top (OTT) providers devices at rest.

In order for certain embodiments described herein to work, the OTT provider must be willing to support pooling of their content within the network (e.g., at rest within the ISPs infrastructure); for example, within capacitors, CDN nodes, and CDN Nodes/TICs. To make this arrangement acceptable to the OTT providers, one embodiment of the invention implements certain protection mechanisms:

The ISP is prevented from extracting content in its native at rest form. In addition, the OTT provider is provided the ability to track where the content is pooled. Moreover, the OTT provider is provided the ability to delete pooled data and no third party is permitted to copy and/or extract the pooled data.

With these preconditions, one embodiment of the invention performs additional layers of encryption on the content and provides markers within the data that validates its authenticity (e.g., such as a block chain). For example, every copy of the data may receive a unique block chain entry and key and can only be decrypted with the block chain. If the data is deleted or removed, then the data is rendered useless.

Instead of a block chain, another embodiment uses a cypher that is time sensitive. For example, a copy which is made may only be valid for a specified duration of time (e.g., a week, a few days, etc).

E. Content Provider Caches (CPC), Micro-CPC Caches, and Temporary Caches

The embodiments of the invention described above include caching techniques which operate in remote, potentially mobile environments, such as Aircraft, Buses, Trains, or Ships. These techniques distribute large datasets to remote locations with predictable distribution times. Leveraging this mechanism can lead to effective caching solutions comparable to existing distribution mechanisms of Internet service provider and media service providers.

Today, for example, Netflix and other providers use an ISP partnership model to distribute content throughout the ISP network into content provider caches (CPCs) such as Open Connect Appliances (OCAs) deployed by Netflix. While some embodiments described below focus on specific media providers such as Netflix, the underlying principles of the invention are not limited to any particular media provider architectures.

One embodiment of the invention comprises a micro-cache method and apparatus for a mobile environment with variable connectivity. Specific implementations distribute a Netflix cache into a mobile environment using various techniques.

One embodiment of the invention includes the following features: (1) the ISP (e.g., Netflix) hosts the CPC within and throughout their networks; (2) the ISP communicates which client IP addresses are associated to the deployed CPC; (3) the ISP ensures that cache fills are fulfilled on a scheduled basis; and (4) If the content is not available within the CPC cache, then the ISP provides connectivity back to Netflix, where long tail content is retained.

One embodiment of the invention builds off of the ISP partnership model, and includes the deployment of CPC's within these remote locations. These embodiments would be particularly beneficial on vehicles such as ships which have a high concentration of a large number of potential viewers. However, the underlying principles of the invention may be implemented in smaller mobile environments such as trains, airplanes, and buses.

Figure 13:
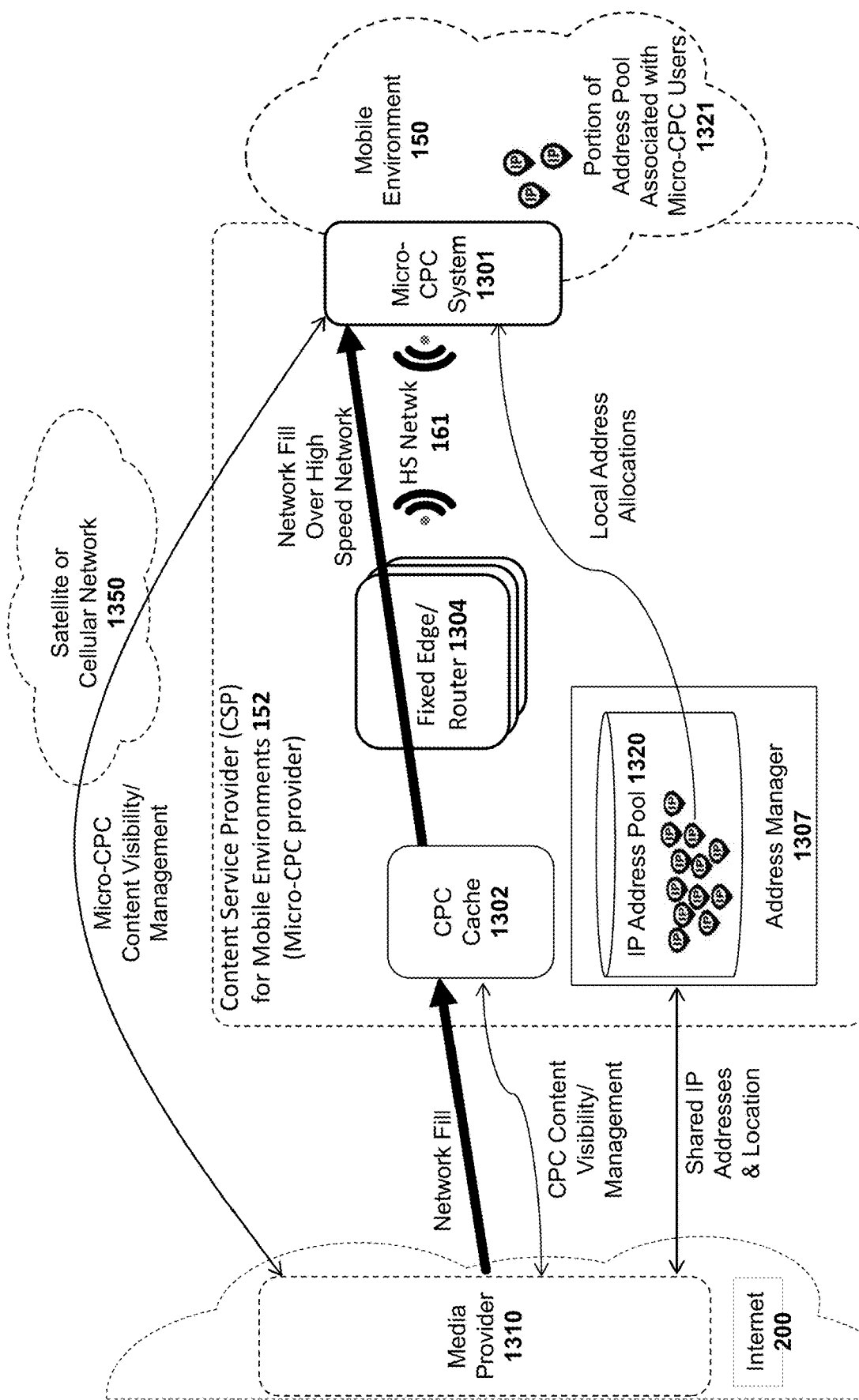
FIG. 13 illustrates one embodiment of an architecture for implementing a micro-cache.

One embodiment is illustrated in FIG. 13 where a micro-CPC system 1301 configured in a mobile environment 150 does not interface with the media provider 1310 as if it were in an ISP network. For example, rather than relying on a protocol such as BGP to distribute addresses of current users to the media provider 1310, the onboard micro-CPC system 1301 notifies the media provider 1310 (e.g., Netflix) that it (a) has an onboard CPC cache containing a specific dataset, and (b) that it is associated with an IP address pool 1320 that can, in turn, be associated with passengers (e.g., via satellite or cellular network). In one embodiment, an address manager 1307 performs the allocation of IP addresses within the micro-CPC system. For example, if the CSP 152 is associated with a specific range of IP addresses such as 10.32.50.x to 10.32.63.x (where x designates any number allowed by the IP addressing scheme), then the address manager 1307 may allocate mobile environment 150 a block of IP addresses such as 10.32.50.0 to 10.32.50.800 or 10.32.50.x to 10.32.51.x. In one embodiment, the address manager 1307 dynamically assigns these address blocks to individual micro-CPC systems 1301 which then assign addresses from within the allowed range to user devices 1321.

Figure 14:
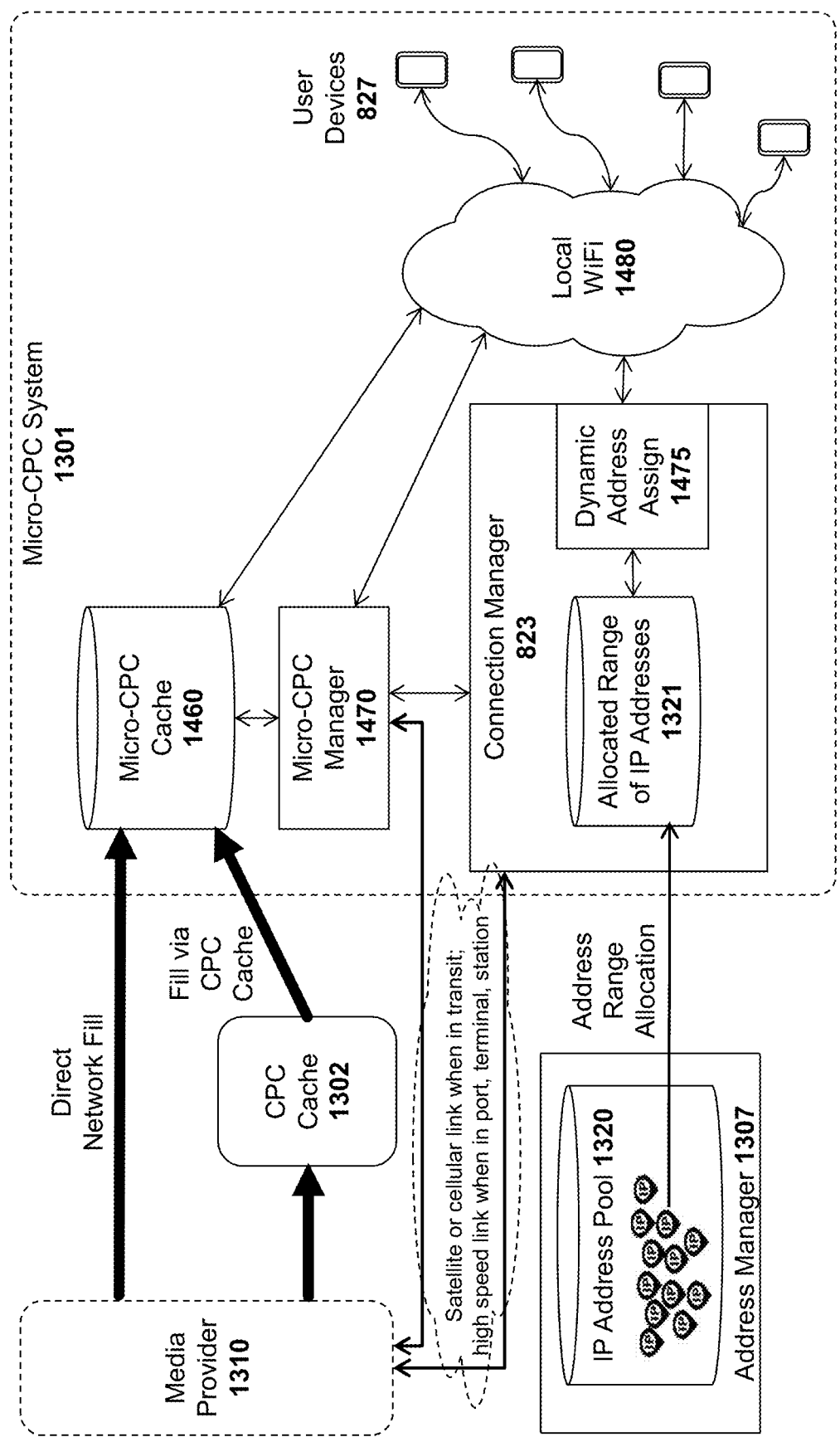
FIG. 14 illustrates one embodiment of a micro-cache architecture including dynamic address assignment at a local network.

FIG. 14 illustrates one embodiment of the micro-CPC system 1301 which includes a micro-CPC cache 1460, a micro-CPC manager 1470, and a connection manager 823 (some examples of which were previously described with respect to FIG. 8). In one embodiment, the allocated range of IP addresses 1321 for the particular mobile environment is provided to the connection manager 823 which includes a dynamic address assigner 1475 to assign IP addresses from within the range to user devices 827 which establish a link over the local WiFi network 1480. A micro-CPC manager 1470 manages the content stored in the micro-CPC cache and, in one embodiment, exposes an API to the media provider 1310 to provide complete visibility and control over the content.

The micro-CPC cache 1460 may be filled directly from the media provider 1310 or may be filled through the CPC cache 1302 (e.g., where the media provider 1310 fills the CPC cache 1302 in accordance with an existing fill policy). In either case, the micro-CPC system 1301 fills the micro-CPC cache 1460 in accordance with a set of rules and/or cache curation policies implemented by the content service provider 152 and accepted/approved by the media provider 1310. A variety of different rules/policies for updating a micro-CPC cache 1460 are set forth above (e.g., as described with respect to the CDN nodes 520 and transparent caches 610). Any of these techniques may also be employed to determine the specific set of media content to be deployed on the micro-CPC cache 1460.

When a passenger contacts the media provider with the media provider's app, application, or browser (or other content channel) on a user device 827, the media provider 1310 looks up the closest CPC cache 1302 as usual, but also looks up the closest micro-CPC 1460 in the event that such a device has registered itself. The media provider's app, application, or browser (once all of the credentials, DRM, Silverlight, etc., are implemented), is then directed to the micro-CPC cache 1460 rather than the CPC cache 1302 allocated to the CSP 152.

Significantly, the media provider 1310 still has complete visibility and control over the distribution of the CPC content, and peers with the micro-CPC provider 152 as a CPC ISP. The micro-CPC provider 152, however, then uses the augmented peer-fill implementations as described herein to ensure that the most relevant content makes it to the micro-CPC system 1301.

In operation, a user device 827 (e.g., with the media provider's app) is dynamically assigned an IP address by dynamic address assigner 1475. A protocol such as the Dynamic Host Configuration Protocol (DHCP) may be used to dynamically assign clients IP addresses from within the allocated range 1321.

Once a user device 827 is connected, it may access the Internet over the connection provided by the plane, train, ship, or bus. This may include, for example, a satellite connection, cellular service, and/or any other connection available to the mobile environment during transit. If the user chooses to access media content offered by the media provider 1310 (e.g., a Netflix show or movie), then the request is sent to the media provider 1310 over the established Internet connection, which authenticates the user device 827. The media provider 1310 may then use the IP address of the requesting device 827 or the connection manager 823 (e.g., which may be configured as an Internet router or Gateway) to identify the micro-CPC cache 1460 within the same mobile environment. If the content is locally available within the micro-CPC cache 1460, it then transmits a redirection response to the user device 827 including the local IP address of the micro-CPC cache 1460 (and/or the micro-CPC manager 1470). If the content is not locally available, the response redirects the user device 827 to the CPC cache 1302 over the Internet link (or to another CPC cache).

Thus, in the above-described embodiment, network fill operations from the media provider 1310 may be performed to the one or more CPC caches 1302 configured at strategic locations within the CSP's network and a subset of this content may be transmitted over the high speed network 161 coupling the mobile environment 150 to the CSP network via edge/router device 1304 while the mobile environment is at a station, dock, terminal, etc. Regardless of the techniques used to fill the micro-CPC system 1301, the media provider maintains full visibility and control over the content stored in each micro-CPC cache.

In one embodiment, this solution is only implemented on a selected subset of the media provider's content. In fact, depending on the nature of the environment, the media provider may provide a constrained user portal that is limited to the content available within the micro-CPC cache 1460. Thus, in this implementation, the passengers/customers would not request content that is not available on the cache.

In another embodiment, a Transparent Cache such as the TIC 810 described above with respect to FIG. 8, is populated with the same dataset. Rather than direct clients to an onboard micro-CPC cache, the media provider 1310 directs the requesting device 827 to a customer specific CPC, such as CPC cache 1302 hosted by the CSP 152. The transparent cache, intercepts media requests targeting the CPC cache 1302, determines whether the media content is stored locally, and, if so, serving the content locally. In this case, the IP ranges may be transmitted to the media provider 1310 via BGP (or other protocol). Note, however, that in contrast to the micro-CPC cache 1460, the media provider 1310 does not have access or control over the transparent cache. The advantage, however, is that these transparent caches propagate media content far more quickly than the micro-CPC cache implementation. In the transparent cache model, the content service provider (CSP) 152 may still notify the media provider 1310 that certain IP addresses only have access to the CPC cache content, and thus trigger a constrained portal view within the user interfaces of the user devices 827.

Several optional features may be implemented, including a centralized approach where customers download the content catalog from the media provider 1310, which is aware of what is present on the micro-CPC cache 1460 or transparent cache. Or a distributed approach, where the network-based authentication occurs, but then defers the catalog to the local cache. Either mechanism will essentially direct the media provider applications running on the user devices 827 to the subset of locally available media content on the micro-CPC cache 1460. Note that the term "application" is used herein to include mobile device apps (e.g., iPhone apps), browser-based program code, and applications running on a laptop computer). In short, any form of program code installed on a user device 827 which provides media streaming functions may be configured to take advantage of the embodiments described herein.

There are a number of configurations that are appropriate to different mobile environments. For example, a bus may only require sufficient streaming capacity to support 50-80 passengers. An airplane, on the other hand, may need to support 100, 200, or more passengers depending on the type of aircraft. A train may need to support as many as 1500 passengers, and a cruise ship as many as 6000 concurrent streams. While an existing CPC cache 1302 may be appropriate for a cruise ship, it is unnecessarily large for a bus (e.g., from the perspective of price point, power consumption, and capability).

However, a standard 30-100 TB cache may be specified as a standard baseline for all of the above-described implementations. The CSP 152 addresses the distribution of the cache updates when a high speed connection is available, and provides a form factor appropriate cache appliance that delivers media streaming capabilities sufficient for each mobile environment.

Using the existing BGP peering model, the media provider 1310 is made aware of the closest CPC cache 1302. In one embodiment, the media provider 1310 provides additional data to indicate whether the IP address represents a location that has limited access and/or greater dependency on the CPC cache 1302. In this scenario, the media provider 1310 treats the device in a special way, only sharing a catalog that can be serviced by the local cache. Existing media providers 1310 may extend existing networking infrastructures to support (a) the unique nature of the address pool, and (b) the locally-cached content for that address pool.

In one embodiment, the CSP 152 implements just a single "core" CPC cache 1302, and replicates the content to the various micro-caches configured on different transportation vehicles/vessels. Having an ISP relationship with the media provider 1310, the CSP 152 simply references the core CPC cache 1302 with BGP, and the media provider is provided with visibility of its media content. Each of the micro-CPC caches 1460 distributed across various transportation fleets, are populated with the same (or a subset of) media content on the core CPC cache 1302.

In one embodiment, the media provider 1310 does not need to have complete visibility of the micro-CPC caches, with the knowledge that these caches contain no more media content than the same set of allowable media content on the CPC cache 1302. The temporary cache (TIC) arrangement may be used for this embodiment. In an alternative embodiment, each micro-CPC cache 1460 is individually registered with the media provider 1310 which explicitly manages the media content and redirects clients to their local micro-CPC caches 1460 as described above.

F. Reverse Filling of Fixed Cache Devices

As mentioned above, a "reverse fill" operation may be performed in some instances where a fixed environment (FE) cache such as a capacitor 510 has a relatively low bandwidth link back to the CPC cache and/or media provider (e.g., if the capacitor is in a remote location). In such a case, when a micro-CPC cache or a temporary cache on a cruise ship, for example, forms a high speed connection with the fixed environment cache, it may perform a reverse fill operation to provide the FE cache with content for the duration of the connection. The edge device may then provide this content to other micro-CPC caches or temporary caches in other mobile environments when they pass within range.

Figure 15:
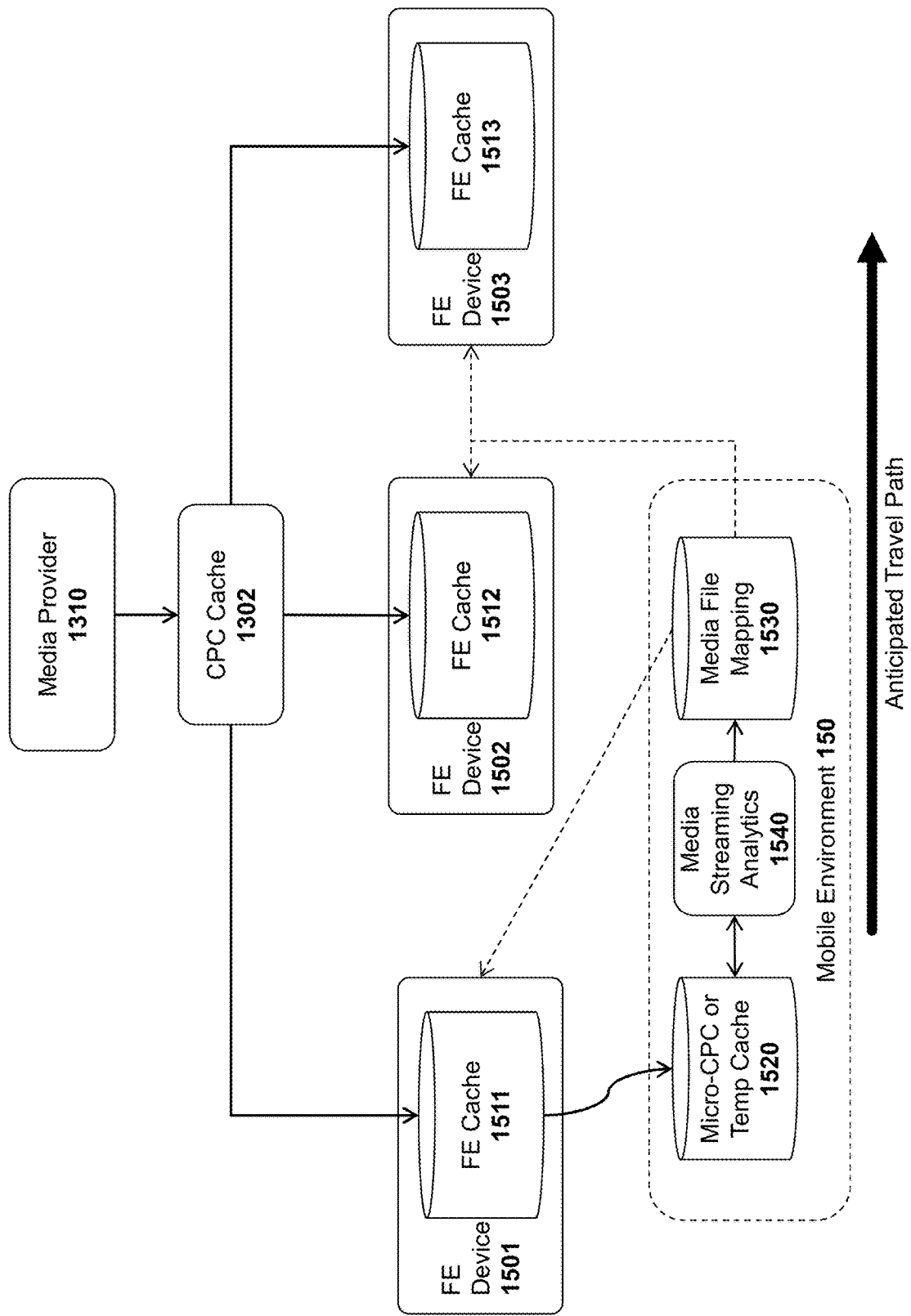
FIG. 15 illustrates one embodiment which uses anticipated travel paths of mobile environments.

In one embodiment, rather than providing all FE caches with the same media content at the same time from the CPC cache 1302, the CPC cache 1302 will transmit different data to each of the FE caches. FIG. 15 illustrates one particular example with three FE devices 1501-1503 each equipped with an FE cache 1511-1513. Rather than streaming all of the same content from the CPC cache 1302, this embodiment may divide the content between each of the three FE caches 1511-1513. Thus, for example, if the bandwidth to each FE device 1501-1503 is the same, ⅓ of the total media content may be transmitted to each FE cache 1511-1513. If each FE device 1501-1503 is configured at a different train station, for example (i.e., the mobile environment 150 is a train), then the micro-CPC cache or temporary cache 1520 will receive ⅓ of the total content from each FE device 1501-1503 and will have all of the content when leaving the station with FE device 1503. An advantage of this approach is that the aggregate capacity to the FE devices 1501-1503 is the sum total of all links to all stations as opposed to being limited to the slowest link to one of the stations. In one embodiment, the reverse fill techniques described above may also be implemented in this environment to transmit media content from the micro-CPC cache or temporary cache 1520 to one or more of the FE devices 1501-1503 (e.g., in cases where the network connection to the CPC cache 1302 is degraded or lost).

In one implementation, the amount of media content transmitted to each FE device 1501-1503 is prorated relative to its link capacity to the CPC cache 1302. For example, if FE device 1501 has a 200 Mbps link, FE device 1502 has a 300 Mbps link and FE device 1503 has a 500 Mbps link, then ²⁄₁₀, ³⁄₁₀, and ⁵⁄₁₀ of the media content, respectively, may be transmitted to these devices. Once the allocated portion of the media content has been transferred to each FE device 1501-1503, the CPC cache 1302 may begin to transmit the remaining data. For example, if ²⁄₁₀ of the media content has been distributed to FE device 1501 and there is still 30 minutes remaining before the train leaves the station, then the CPC cache 1302 may transmit as much of the remaining ⁸⁄₁₀ of the media content as possible to the FE cache 1511 within the remaining time.

An additional optimization may be applied to the above embodiments. Media content can be encoded into many small files, most of which have nonsensical hashed names. The core CPC cache 1302 may attempt to group these files together to ensure that a cohesive set of media content can be retrieved from each FE device 1501-1503. For example, with 10 movies, each encoded into 100 files, resulting in 1000 total files, the utility of the media content will be based on the specific grouping of files capable of being retrieved by the user device. For example, a user may only begin to play a movie if that user has the correct set of files required for playback (e.g., file numbers 1-10 associated with movie #1). If the media content in the above example is distributed as 33 files from each movie to each FE cache 1511-1513, then no FE will have any complete movies, and the utility is zero.

To address this issue, one embodiment of the system determines the particular set of files associated with each movie and attempts to distribute these files to the same FE cache 1511. For example, movies 1-3 may be sent to FE device 1501; movies 4-7 to FE device 1502, and movies 8-10 to FE device 1503. In addition, the files for a given movie may be transmitted sequentially, starting from the beginning of the movie to the end of the movie. Then at least those movies can be viewed while waiting on the rest of the movies to arrive on the micro-CPC cache or temporary cache 1520.

In this embodiment, a media streaming analytics engine 1540 may monitor which files are sequenced relative to one another. For example, when a user watches Movie #1, the specific sequence of files streamed to the client may be tracked by the media streaming analytics engine 1540 and stored as a media file mapping 1530 (e.g., a table data structure associating each media item with a plurality of files). Of course, if the media provider 1310 provides metadata relating the files to media items, then the metadata may be used for this purpose.

Upstream content distribution networks (CDNs) such as those operated by Akamai and Amazon CloudFront are implemented as proxy caches which request and store content from upstream caches when the content is requested locally. One embodiment of the invention utilizes components of this architecture, but requests upstream data intelligently, based on accumulated requests distributed across all vehicles/vessels in the fleet.

Figure 16:
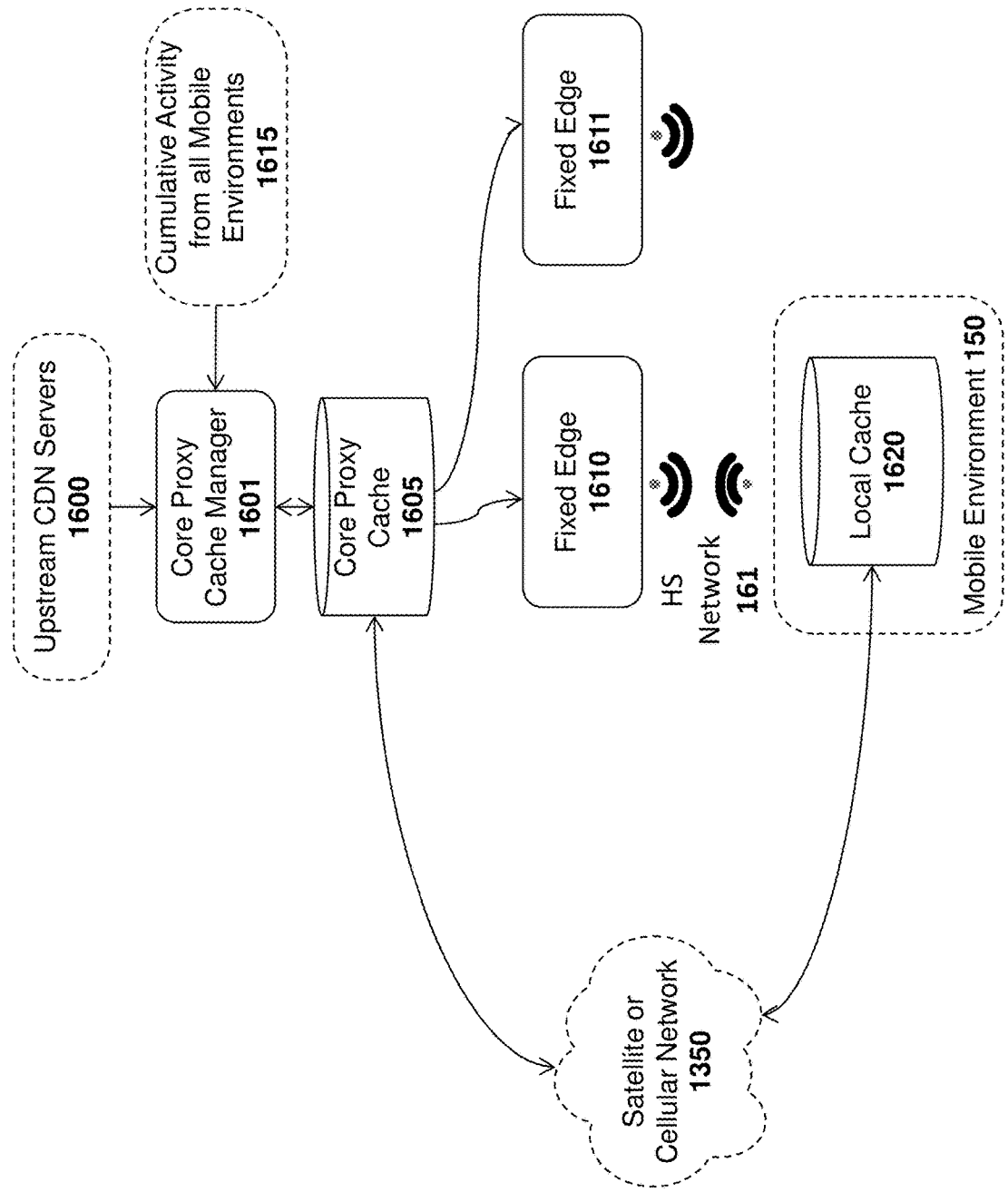
FIG. 16 illustrates one embodiment which includes different connections to a local cache in a mobile environment.

Referring to FIG. 16, the bulk updates described herein, between a fixed edge 1610 and local cache 1620 within a mobile environment 150, address some of the physical limitations associated with sending requests upstream. When a vehicle/vessel 150 arrives at a station, high speed network links 161 are used to provide these bulk updates. Providing bulk data at the lowest level of the CDN hierarchy (e.g., local cache 1620) ensures that upstream requests generated within the mobile environment 150 will be reduced.

Given a large number (e.g., 100) of vehicles/vessels in the field, cache misses will occur somewhat distributed across the different vehicles/vessels, although some may occur concurrently (e.g., when a breaking story is reported in the news). In one embodiment, cache miss requests generated in the mobile environment 150 are transmitted over the low speed network (e.g., cellular, satellite) 1350 back to the core proxy cache 1605. If necessary, the core proxy cache 1605 will call upstream 1600 to fetch the data and send it down to the local cache 1620 in the requesting mobile environment 150. Any other passengers in the mobile environment 150 who attempt to view the media will be served directly from the local cache 1620.

In this implementation, the core proxy cache manager 1601 becomes aware of the cumulative activity from all mobile environments 1615, including all local cache misses which were serviced from the upstream CDN servers 1600 and stored in the core proxy cache 1605. When each individual mobile environment 150 arrives at a fixed edge 1610 with a high speed network 161, the core proxy cache will include up-to-date content from the cumulated misses, which will be pushed out to each mobile environment. Effectively, for 100 trains, for example, the 100 trains aggregate misses, and the results are shared after the next update cycle.

In one embodiment, if the same requests are seen originating from multiple mobile environments (e.g., using a threshold such as 10%, 15%, etc) then the requested content may be categorized as a high demand item. Consequently, this media item may be pushed out to all mobile environments 150 via the low speed network 1350, anticipating that a very high percentage of passengers will want to access it.

In summary, a single core proxy cache 1605 becomes the sum total of requests from N mobile environments (e.g., where N=50, 100, 400, or any other number). The requested content is pushed out from the core proxy cache 1605 to all N mobile environments over the high speed network in a course grained frequency (e.g., daily), using finer grained frequency (e.g., minutes), potentially over the low speed network 1350 for items which are determined to be in very high demand.

Certain embodiments deploy media caches in remote locations where essential static content may be managed and viewed locally. In this implementation, the distribution techniques can be considered orthogonal to the consumption techniques, as with current video on demand (VOD) systems.

Using one embodiment of the invention, rather than deploying a VOD system on a single vessel/vehicle, the VOD system may be deployed on a public or private website. Consequently, anyone who can reach that website is provided with the same experience as a passenger on the vessel/vehicle.

In one embodiment, the public/private website is mapped to the CDN described in FIG. 16, or any of the other implementations described above, and the entire website and CDN content is replicated onto each vessel/vehicle concurrently and consistently. The experience of a train passenger, for example, is that they are visiting the public/private website, but instead the local cache 1620 is providing the website data and media content as a cache instance.

As mentioned, one embodiment of the invention includes a system and method to analyze content usage and mobile environment data to prioritize and schedule distribution of the content.

G. Prioritizing and Scheduling the Distribution of Learned Content

Figure 17:
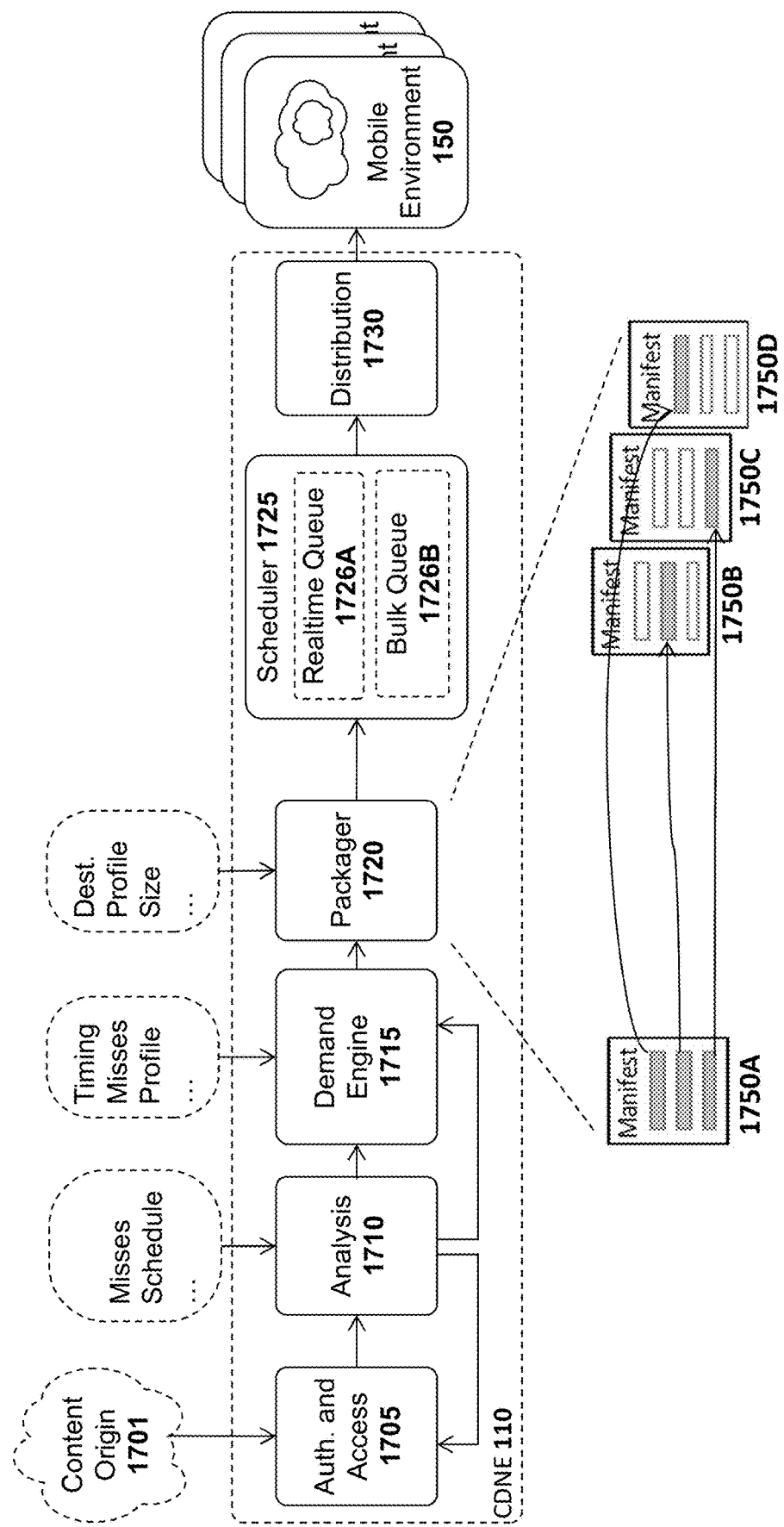
FIG. 17 illustrates one embodiment of an architecture for distributing content to a mobile environment.

FIG. 17 illustrates one embodiment of an architecture which includes authentication and access logic 1705 to securely connect to the content origin 1701 (e.g., a content provider) and retrieve the content to be distributed. An analysis engine 1710 evaluates data related to the content and the usage of the content to determine a demand value for each item of content. A demand engine 1715 evaluates the demand value in combination with timing data, cache misses, and profile data related to the mobile environments (e.g., storage capacity, overall and per-user bandwidth).

Based on the evaluation performed by the demand engine 1715, the packager logic 1720 performs modifications certain content. For example, for extremely popular titles (e.g., identified by the analysis engine 1710 or demand engine 1715), the packager 1720 may generate or acquire different bitrate versions of the content. Any transformations performed may be specified by the packager 1720 in customized manifest files 1750B-D and transmitted to each respective mobile environment 150. The customized manifest files 1750B-D may be generated using data from an original manifest file 1750A provided by the content provider. Briefly, a manifest file specifies the different bitrates available for the associated content. In this embodiment, the manifest file 1750A is modified to generate manifest files 1750B-D customized for each individual mobile environment 150 so that a video player or web browser can identify the highest quality content available locally (e.g., when the high speed network is disconnected).

In one embodiment, a scheduler 1725 generates a distribution schedule for transmitting the various items of content based on known or anticipated schedules of the mobile environments 150 and the anticipated demand for each item of content within each mobile environment 150.

Once the schedules are set, distribution logic 1730 manages transmission to each of the mobile environments 150 and reports results back to the scheduler 1725 and/or content provider. The content may be distributed via any available network technology including, but not limited to, high speed Ethernet, WiFi, cellular (e.g., 5G), mmWave, and Sneaker-Net.

In one embodiment, the architecture in FIG. 17 makes optimal use of the constrained connections to the mobile environments 150 by implementing one or more of: (1) multi-factor analytics to prioritize and determine an order in which to transmit titles; (2) a multi-path distribution system; (3) real-time queuing constraints; and (4) profile-based constraints.

With respect to multi-factor analytics, the demand engine 1715 may implement explicit prioritization and/or prioritization based on learned demand. Explicit prioritization may be employed by setting priority values for certain content based on the anticipated demand for those titles. For example, when a blockbuster movie is initially released for streaming, it may be assigned a relatively high priority. The demand for the movie may then be tracked over time and the priority level adjusted accordingly. The learned demand is the demand determined by monitoring content usage. In one implementation, the priority is selected from one of several discrete priority values (e.g., priorities 1-5). Thus, the learned demand may be adjusted for content based on crossing of a threshold (e.g., total requests, number of cache misses, etc). In addition, multi-factor analytics may involve explicit, timed delivery. That is, specific content can be "watched for" at specific times and delivered with high priority regardless of cache misses.

With respect to multi-path distribution, in one embodiment, the scheduler 1725 schedules different priority content using different queues 1726A-B. For example, lower-priority content may be stored in a "bulk" queue 1726B for distribution when the edge nodes of the mobile environment 150 have a high-capacity connection (such as when they are at a station). Higher-priority content may be stored in a "real-time" queue 1726A for distribution over any available connections including cellular connections.

With respect to real time queuing, the scheduler 1725 may take various constraints into consideration. This may include, for example, limits on how much bandwidth can be consumed at different times and limits on how much data can be utilized over a given timeframe.

With respect to profile-based constraints, the packager 1720 may tailor any transformations/packaging of the content in accordance with limitations of each mobile environment 150. For example, edge nodes may have different cache capacities so content can be selectively targeted for different nodes based on available space vs. priority. In addition, the demand engine 1715 may evaluate profile data and other relevant data to tailor prioritization based on regional location (e.g., specific content can have different priorities in different geographical regions).

H. Embodiments for Trans-Border Movement of CDN Content

One embodiment of the invention includes a system and method to support trans-border movement of media content. In particular, because the different laws in different jurisdictions relate to the proper management of media content, when a transportation vehicle passes between jurisdictions these embodiments dynamically adjust the manner in which the media content is managed.

In one embodiment, because the availability of content needs to align with the region that the vehicle is in at any given point, the applications that access the mobile cache need to be know what region they are in, and access cache information appropriately. Thus, in the mobile CDN environment, the connection—which remains fixed within the local transportation environment—must reflect the current geolocation.

Figure 18:
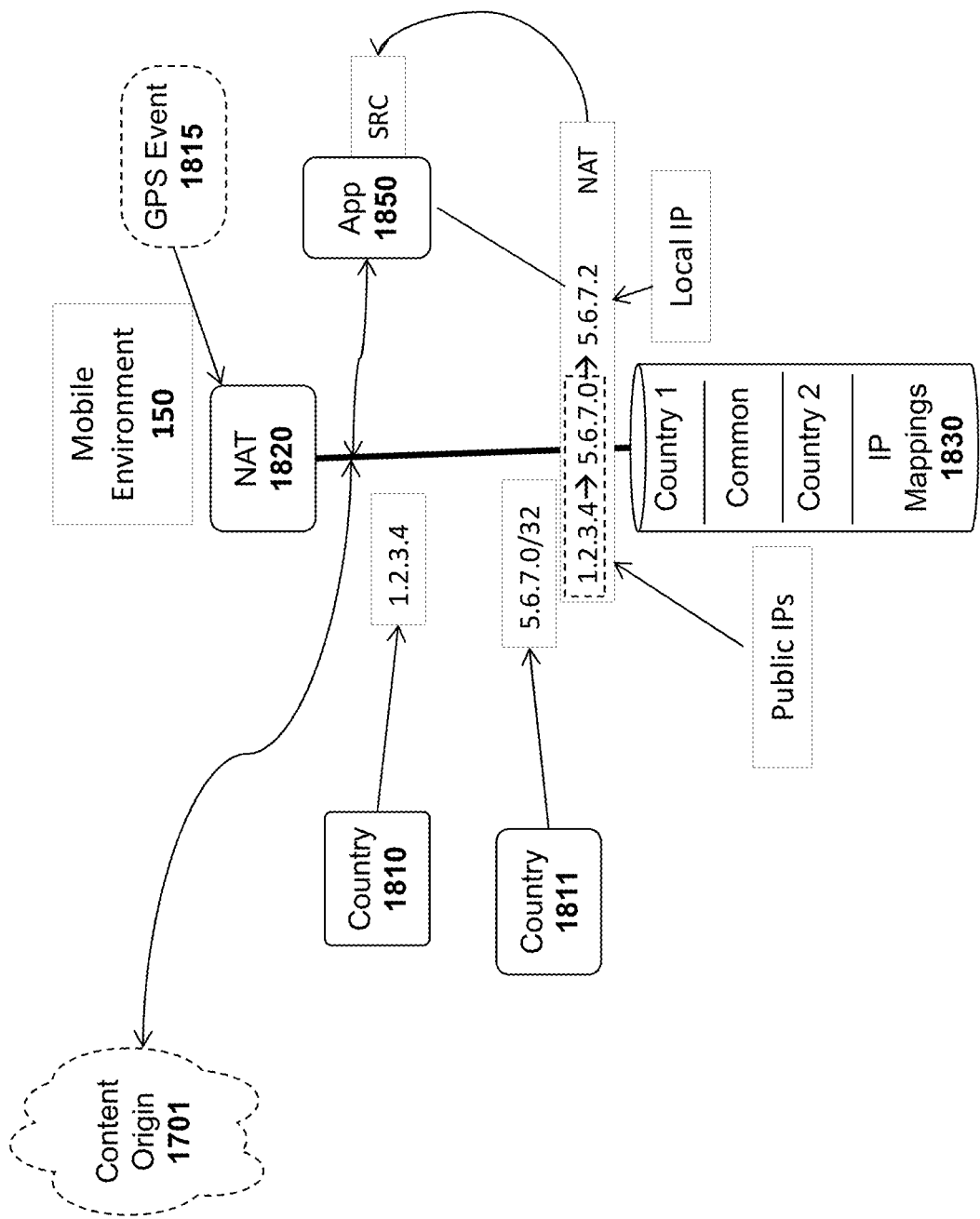
FIG. 18 illustrates one embodiment for managing content delivery across boundaries.

One embodiment will be described with respect to FIG. 18, which provides an example in which a mobile environment 150 moves between a first country 1810 in which it uses a first public IP address (1.2.3.4) and a second country 1811 in which it uses a second public IP address (5.6.7.0/32). In one embodiment, the vehicle IP Address in the mobile environment 150 goes through NAT circuitry 1820 to perform network address translations to an IP subnetwork of the "home" region as previously described. The NAT circuitry 1820 may be integral to the network router configured within the mobile environment 150.

In one implementation, IP mappings 1830 are stored within the network router and used to translate between the public IP addresses of countries 1810-1811 and the local IP addresses used within the mobile environment 150. The cached content in the mobile environment 150 is a superset of all regions associated with the route of the journey. Based on a GPS event 1815 being detected (e.g., in response to a GPS device indicating movement between the countries 1810-1811), a route is inserted ahead of the network address translation to reflect new regional IP Address (e.g., 5.6.7.0 instead of 1.2.3.4).

As the user app 1850 (e.g., a Netflix app on a mobile device or other app for rendering video content) continues with the home source, the new regional IP address is geo-located by the content owner's current processes (e.g., a lookup that links the IP address to a particular country) and a decision is made as to whether to continue streaming based on the requirements of the new country 1811.

I. CDNE Cache Hierarchy with Advanced Content Tracking, Security, and Visibility to Content Owners One embodiment of the CDNE includes a multi-tier cache hierarchy with advanced content tracking, security, and visibility features. For example, one embodiment implements an immutable ledger for tracking and managing content distributed across a plurality of mobile environments and sourced from a plurality of content providers. In particular, Block Chain-based immutable ledgers may be used to track and verify where content is distributed within the CDN network extender footprint, including all fixed and mobile caches maintained by the CDN extender 110. For content providers and owners requiring demonstrable control of content titles across the entire network, these embodiments also provide secure and fully auditable tracking of each title from the time it enters the network of the CDN extender 110 until the time it is purged from the system. At any intermediate points where a title is cached, it is an encrypted blob, giving the content owner or provider all of the characteristics of an encrypted tunnel from their current, large-scale edge network to all cached instances of the content including, but not limited to, content stored at the fixed edges 184, mobile edges 185, and micro-CPC caches 1460, to name a few.

Figure 19:
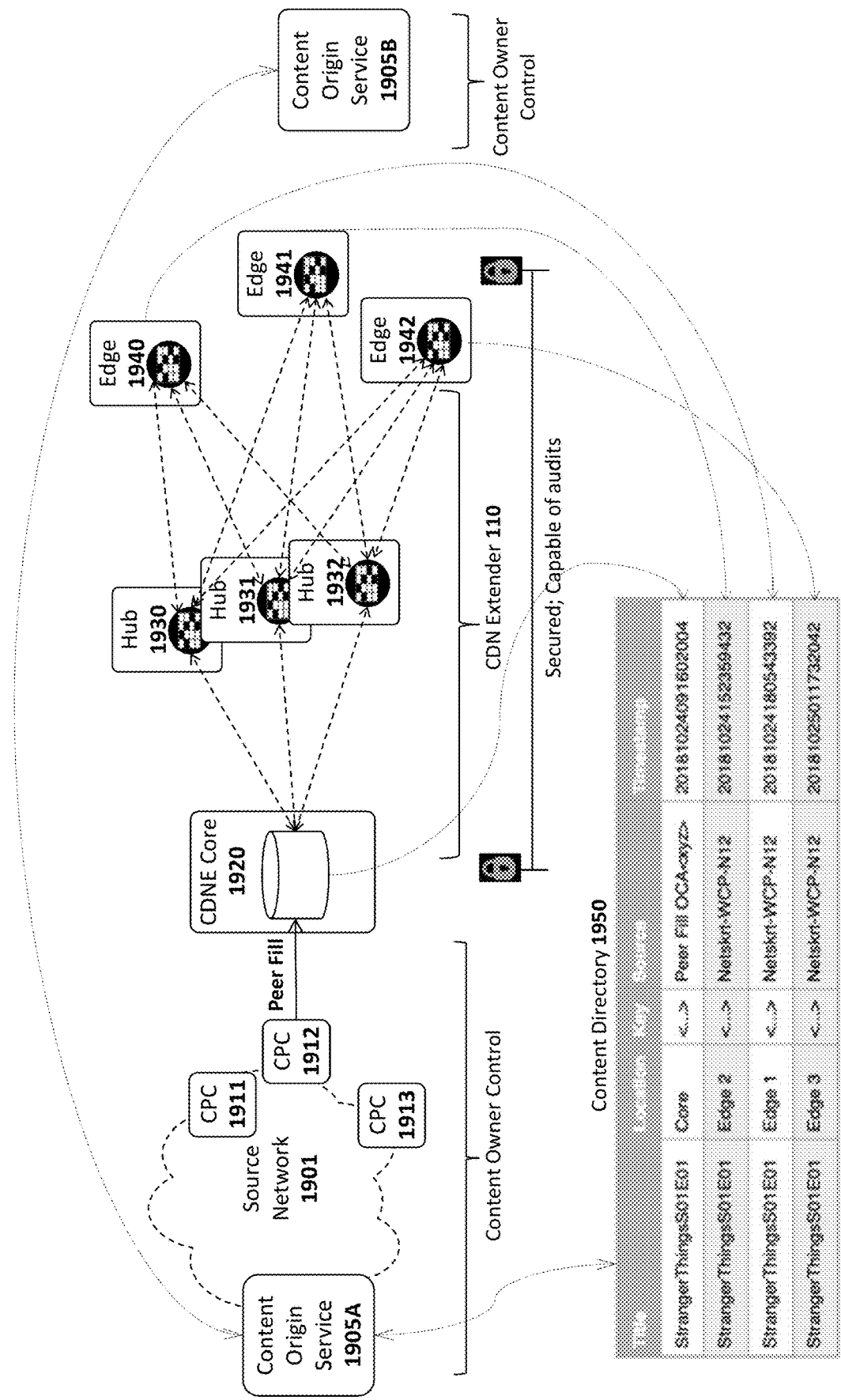
FIG. 19 illustrates one embodiment of a CDNE cache hierarchy and techniques for monitoring cached content.

One particular implementation will be described with respect to FIG. 19, which shows a content origin service 1905A such as Netflix coupled to a plurality of content provider caches (CPCs) 1911-1913 (e.g., OCA caches for Netflix) over a source network 1901. In this embodiment, the CDN extender 110 includes a CDNE core cache 1920 which establishes a peer connection to one or more of the CPCs 1912 to receive peer fill operations, populating its cache with content from the CPCs 1911-1913.

In one embodiment, the CDNE core 1920 is at the top tier of the CDNE 110 caching hierarchy, potentially caching all or a large subset of titles offered by the content origin service 1905A. While only a single CDNE core 1920 is shown for simplicity, the CDNE extender 110 may include several CDNE cores 1920 which maintain coherency via peer-based message passing, a shared directory database, or other synchronization techniques. In one embodiment, the CDNE core 1920 participates as a peer in the content owner's direct-to-ISP network.

A plurality of intermediate hub devices 1930-1932 receive content updates from the CDNE core 1920 over secure communication channels within the network of the CDNE extender 110 and pass the content updates to the edge caches 1940-1942. In one embodiment, the content is transmitted over encrypted communication channels to protect the underlying media content (e.g., encrypted with transport-layer security (TLS) and/or using a shared ledger architecture as described below).

One embodiment of the invention continually updates a content directory 1950 to reflect the propagation of content throughout the network of the CDN extender 110. For example, FIG. 19 shows the CDNE core 1920 generating an entry updating the content directory upon receipt of a particular media content title and the edge caches 1940-1942 updating the content directory 1950 upon receipt of the media content from the hubs 1930-1932. In one embodiment, a new entry is added to the content directory 1950 for each content title received at each edge cache 1940-1942 and the CDNE cores 1920. Each entry includes an identifier of its current location, a decryption key, a source indication (i.e., specifying the network component from which it received the content), and a timestamp (indicating the time at which the content was received). With the proper authentication, the content owner/provider 1905A can thereby track the location of any of its content as it is distributed across the network of the CDN extender 110.

Figure 20:
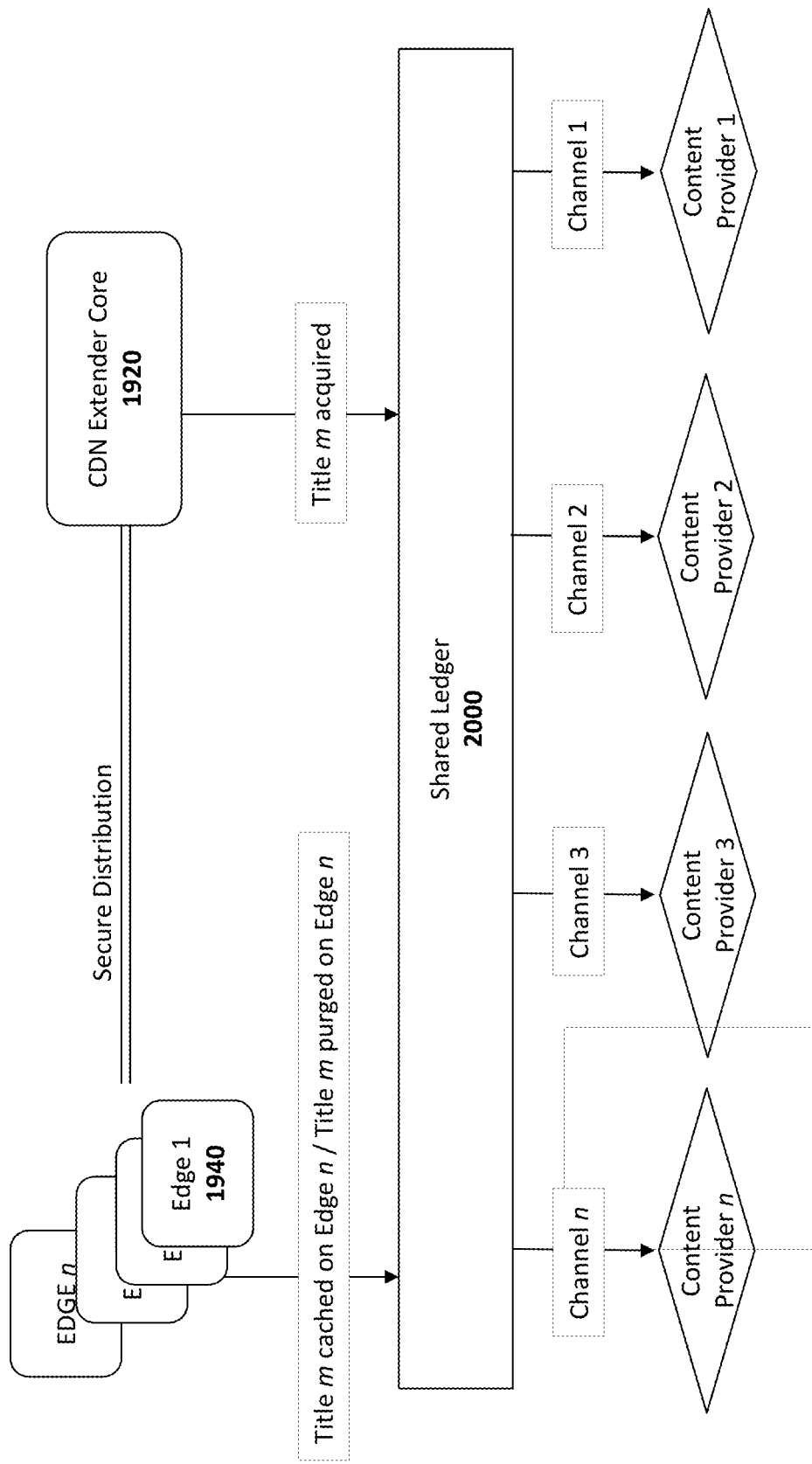
FIG. 20 illustrates one embodiment in which a shared ledger is used to authenticate cached data.

As illustrated in FIG. 20, in one embodiment, a shared ledger fabric 2000 is used to provide heightened authentication and security. The shared ledger fabric 2000 establishes a channel to each content owner carried over the network of the CDNE 110. When a content title is received, a ledger entry is generated within the shared ledger fabric 2000 to record the event. The content owner/provider may then authenticate and view the ledger entry.

In one implementation, an encryption key is received from the content owner which the CDNE 110 uses to encrypt and package the content for distribution. They CDNE 110 may receive the encryption key directly or via the shared leger 2000. The encrypted title package is transmitted through the CDNE network, including the intermediate hub locations 1930-1932 where it is stored in its encrypted form. When the content title reaches one of the edge caches 1940-1942, the key is received from the content owner 1905A-B which the edge caches 1940-1942 use to decrypt the package and load the underlying content into one or more operational caches. A ledger entry records the event and is visible immediately to the content owner/provider, as a record of each new copy of their content. For example, a content title may be purged from an edge cache 1940-1942 to make room for newer/higher demand content.

The shared ledger 2000 is responsively updated to reflect the changes and made immediately visible to the content owner. In one implementation, the content owner is provided with the option to issue a "revoke" transaction (via the shared ledger or outside the shared ledger) which it may execute to purge a content title from each CDNE location (e.g., cores, edge caches).

In embodiment the shared ledger fabric 2000 is implemented using blockchain-based security. In particular, the ledger fabric 2000 comprises a list of records, called blocks, where each block contains a cryptographic hash of the previous block, a timestamp, and transaction data (generally represented as a Merkle tree). In this implementation, each entry of the content directory 1950 includes a key which is a hash of the previous entry. This embodiment results in an immutable ledger to track and verify where content is distributed within the CDNE 110.

In addition, at any intermediate points such as the hub devices 1930-1932, media content titles are stored as encrypted blobs effectively providing an encrypted tunnel between the content provider edges such as CPC caches 1302 and the CDNE edges 1940-1942 and/or micro-CPCs 1460.

J. Caching Aggregate Content Based on Limited Cache Interaction

Figure 21:
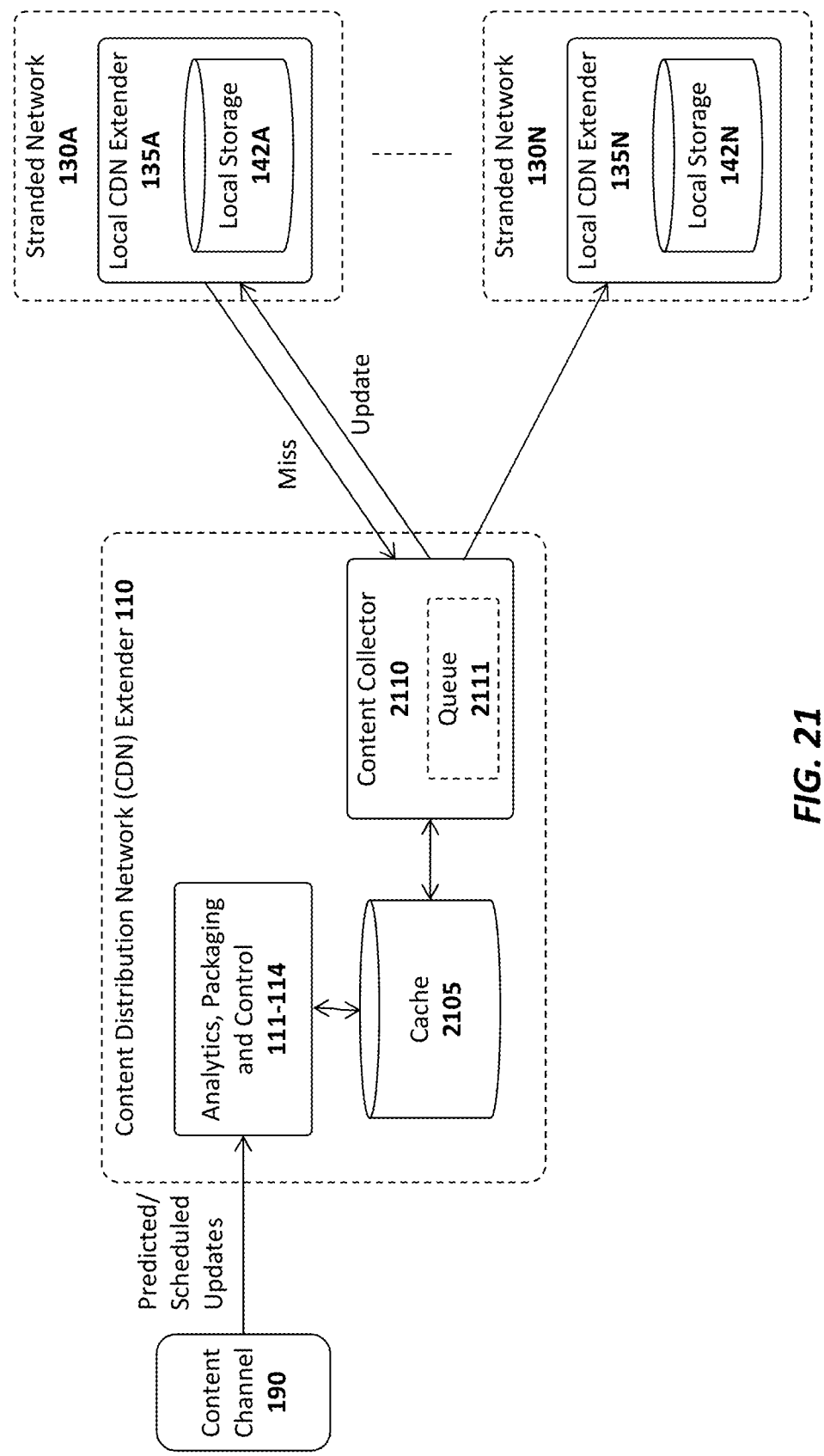
FIG. 21 illustrates one embodiment in which content is collected from stranded networks.

Referring to FIG. 21, one embodiment of the invention aggregates content across its caches 2105 using data collected from the various mobile environments, thereby reducing bandwidth from the various content channels 190. In particular, this embodiment builds caches 2105 based on aggregate inputs from stranded networks 130A-B and a contextual awareness of the specific data being cached.

Traditional content delivery networks cache the content that one user accesses so that other users can be served that same content more quickly next time. In the constrained mobile environment, however, there is not a sufficient scale for this to work. One embodiment flips this problem around. In particular, in response to certain events (e.g., a threshold number of misses within local storage 142A-N of local CDN extenders 135A-N), a trigger-based content collector 2110 attempts to retrieve every segment for an entire content title from the stranded networks 130A-N of passing mobile environments 150. In one embodiment, the trigger-based content collector 2110 attempts to retrieve segments at all, or a specified set of content bitrates.

In addition, as stranded networks 130A-N of mobile environments pass by the CDN extender 110, the trigger-based content collector 2110 progressively pushes segments which are not found on the associated local storage devices 142A-N, thereby synchronizing the local storage devices 142A-N with respect to particular content titles.

The content collector 2110 may implement both proactive and dynamic techniques populate its cache 2105. For example, on a periodic schedule, it may scan a content provider's website looking for new content titles and adding each new network address to a retrieval queue 2111. It may then work through its queue 2111 to pull the content titles from the website.

In addition, the trigger-based content collector 2110 may operate based on cache miss data aggregated across all edge nodes. Each cache miss may be evaluated and the corresponding URL extrapolated to identify the full content title, which may be added to the collector's queue 2111. The end result is complete titles collected at the core cache 2105 of the CDN extender 110 that are available for distribution to the edges.

One embodiment of the invention comprises a system and method for transforming video manifests for more efficient media distribution and storage. In particular, this embodiment reduces the number of active flows within a manifest that makes up a title (storage reduction) and performs progressive distribution of flows to ensure more rapid distribution of a given title (e.g., by transmitting lowest bitrate content first, then medium bitrate content, then the highest bitrate content).

As previously described with respect to FIG. 17, the manifest file 1750A informs the player app on the end user device what stream rates are available for a title. The higher-rate streams collected by the content collector 2110 are significantly larger than the lower-rate streams, which creates an opportunity to optimize distribution and/or storage.

In order to make optimal use of the real-time delivery channel, the packager 1720 generates a special package for a content title with the higher-rate streams removed and modifies the manifest file 1750A associated with the content title, excluding one or more entries associated with the highest bitrates to generate the one or more customized manifests 1750B-D. The smaller media file can then be transmitted through the real-time queue 1726A of the scheduler 1725 for immediate availability in the mobile environments 150. In contrast, the full package containing all of the stream rates (and the full manifest 1750A) can be added to the bulk delivery queue 1726B. In one implementation, when the mobile environment edge enters a bulk window of time, such as when the mobile environment 150 has a high-capacity connection (e.g., at a station), the low bitrate version is replaced with the high bitrate version.

In addition, one embodiment services cache misses in real-time. In particular, this embodiment proactively creates and distributes special manifests for content that has not been distributed yet that specifically references only the low streaming rates. This leverages normal cache behavior to cache the low rate segments as they stream. One implementation limits the number of concurrent streams allowed; once the limit is reached, then others are blocked from starting.

K. Leveraging Mobile Environment to Distribute Cache Data

One embodiment of the invention leverages the mobile environment to distribute cache data using a reverse fill. This embodiment relies on distribution protocols enable rapid distribution of content throughout a diverse fleet of mobile environments 150.

Moving petabytes of data across a network has the potential to incur high data costs. The introduction of the intermediate "hub" nodes 1930-1932 between the CDNE core 1920 and edge nodes 1940-1942 creates the opportunity to capitalize on the movements of the edge nodes 1940-1942 to progressively distribute content across the network.

As new titles are collected, they can be "sprayed" across the hub nodes 1930-1932. So, for example, content title 1 may go to hub 1930 and content title 2 may go to Hub 1931. When edge 1940 arrives at hub 1930, it picks up content title 1 and then it travels to hub 1931. At hub 1931, it drops off content title 1 and then picks up content title 2. When it gets back to hub 1930, it then drops off content title 2. With more edges and hubs, the process is multiplied, significantly reducing the usage and cost associated with the connection to the content provider's network.

Figure 22:
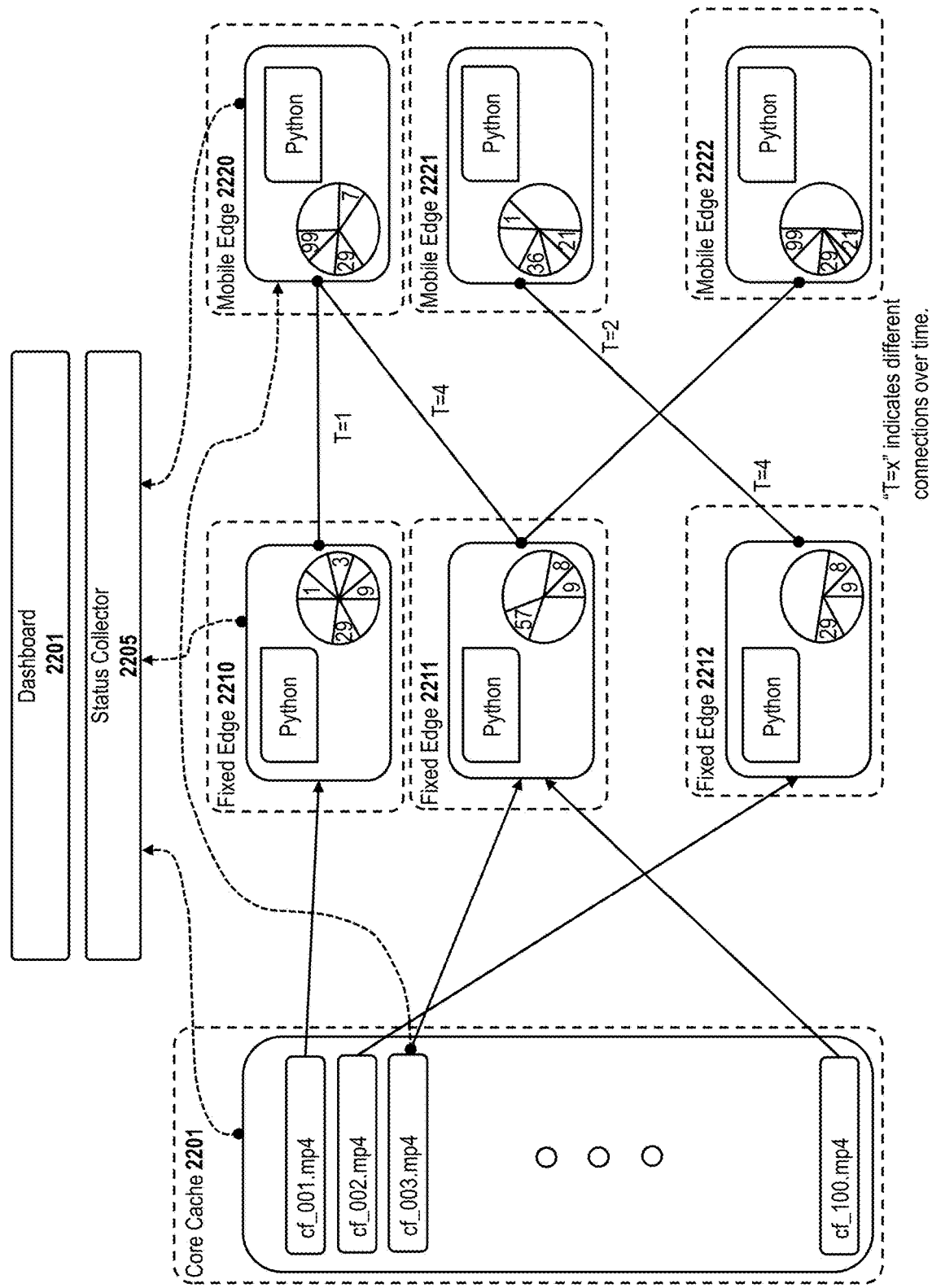
FIG. 22 illustrates one embodiment comprising a plurality of fixed and mobile edges.

FIG. 22 illustrates one embodiment in which fixed edges 2210-2212 are populated from both a core cache 2201 and mobile edges 2220-2222. A status collector 2205 gathers data from each of the fixed edges 2210-2212 and mobile edges 2220-2222 indicating the content titles and associated segments stored thereon. The data is then provided to content delivery administrators via a dashboard graphical user interface (GUI) 2201.

L. Enabling Walled Garden Solutions with Mobile CDN

One embodiment of the invention implements a walled garden with a mobile content delivery network (CDN). This embodiment transforms a walled garden solution where every mobile environment hosts its own footprint, to one where a single over-the-top (OTT) or Intranet-based streaming solution is managed by the CDN extender 110.

There are two significant challenges with current walled garden solutions, also known as video on demand (VOD) systems, that lead to their limited adoption including the fact that relatively static, stale content is labor-intensive to update. In addition, accessing the content requires either a special app to be downloaded before users are on the vehicle, or a locally-managed website on each vehicle.

In one embodiment, the VoD system is deployed as a public or private website, which is then mapped as a content source in the mobile content delivery networks described herein. The techniques described herein are then used to replicate the content across all of the mobile environments 150. The end user in the mobile environment 150 then accesses the content like any other website, except that all of the data is served by the cache so no external connectivity is required. From the perspective of the service provider, the user only needs to update the one primary website and the CDN extender 110 handles the distribution to all of their vehicles.

Figure 23:
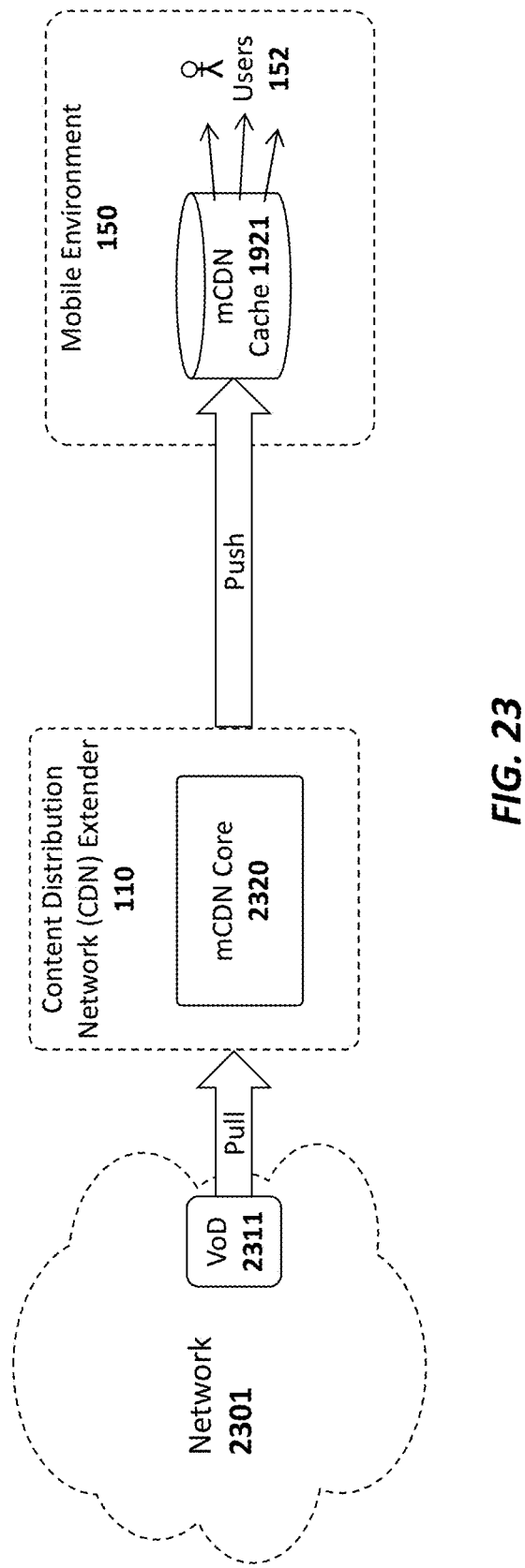
FIG. 23 illustrates one embodiment in which a CDN extender retrieves video on demand data and distributes the video to a mobile environment cache.

One embodiment is illustrated in FIG. 23, which shows a video on demand (VOD) node 2311 of a content distribution network 2301. The CDN extender 110 pulls content from the VoD node 2311 as described herein and stores the content within the micro-CDN core cache 2320. The CDN extender 110 pushes the content to the micro-CDN caches 1921 of the various mobile environments 150 as described herein.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   a first cache to store content titles from one or more content providers and to selectively distribute the content titles to a plurality of secondary caches integrated with a corresponding plurality of mobile environments that each comprise a transportation vehicle or vessel, a content title of the content titles comprising a plurality of title segments; and
   a content collector coupled to the first cache, the content collector to cause title segments to be collected from the plurality of secondary caches and stored in the first cache, the content collector to identify the title segments to be collected and stored in the first cache based on an evaluation of aggregate cache usage data provided by the plurality of secondary caches, including cache miss events of the plurality of secondary caches within the corresponding plurality of mobile environments.

2. The system of claim 1, wherein selectively distributing the content titles comprises transmitting manifests of the content titles to the plurality of secondary caches, the manifests indicating one or more stream rates corresponding to the content titles.

3. The system of claim 2, wherein a manifest of a content title is transformed prior to transmitting to a secondary cache of the plurality of secondary caches, wherein the transformation of the manifest removes one or more entries associated with one or more highest stream rates from the manifest.

4. The system of claim 3, wherein the content title associated with the transformed manifest is available to the plurality of secondary caches upon corresponding transportation vehicles or vessels having a lower capacity connection with the first cache, while a corresponding content title associated with the manifest before the transformation is available to the plurality of secondary caches upon the corresponding transportation vehicles or vessels having a higher capacity connection with the first cache.

5. The system of claim 1, wherein the evaluation of the aggregate cache usage data comprises detecting one or more trigger events associated with a particular content title.

6. The system of claim 5, wherein the one or more trigger events comprises a cache miss threshold or content request threshold being reached.

7. The system of claim 6, wherein responsive to a first trigger event associated with a first one or more cache miss or content request thresholds, the content collector is to attempt to collect all title segments for a first content title at all or a specified subset of stream rates in which the first content title is encoded.

8. The system of claim 1, wherein the content collector is to maintain a content retrieval queue, and wherein content retrieval operation is performed in a prioritized order, each retrieval operation associated with a particular content title.

9. A method comprising:
storing content titles in a first cache from one or more content providers, the content titles to be selectively distributed to a plurality of secondary caches integrated with a corresponding plurality of mobile environments that each comprise a transportation vehicle or vessel, a content title of the content tiles comprising a plurality of title segments; and
causing title segments to be collected from the plurality of secondary caches and stored in the first cache, wherein the title segments to be identified, collected, and stored in the first cache based on an evaluation of aggregate cache usage data provided by the plurality of secondary caches, including cache miss events of the plurality of secondary caches within the corresponding plurality of mobile environments.

10. The method of claim 9, wherein selectively distributing the content titles comprises transmitting manifests of the content titles to the plurality of secondary caches, the manifests indicating one or more stream rates corresponding to the content titles.

11. The method of claim 10, wherein a manifest of a content title is transformed prior to transmitting to a secondary cache of the plurality of secondary caches, wherein the transformation of the manifest removes one or more entries associated with one or more highest stream rates from the manifest.

12. The method of claim 11, wherein the content title associated with the transformed manifest is available to the plurality of secondary caches upon corresponding transportation vehicles or vessels having a lower capacity connection with the first cache, while a corresponding content title associated with the manifest before the transformation is available to the plurality of secondary caches upon corresponding transportation vehicles or vessels having a higher capacity connection with the first cache.

13. The method of claim 9, wherein the evaluation of the aggregate cache usage data comprises detecting one or more trigger events associated with a particular content title.

14. The method of claim 9, wherein a content retrieval queue is maintained, and wherein content retrieval operation is performed in a prioritized order, each retrieval operation associated with a particular content title.

15. A non-transitory machine-readable medium having program code stored thereon which, when executed by a machine causes the machine to perform:
storing content titles in a first cache from one or more content providers, the content titles to be selectively distributed to a plurality of secondary caches integrated with a corresponding plurality of mobile environments that each comprise a transportation vehicle or vessel, a content title of the content tiles comprising a plurality of title segments; and
causing title segments to be collected from the plurality of secondary caches and stored in the first cache, wherein the title segments to be identified, collected, and stored in the first cache based on an evaluation of aggregate cache usage data provided by the plurality of secondary caches, including cache miss events of the plurality of secondary caches within the corresponding plurality of mobile environments.

16. The non-transitory machine-readable medium of claim 15, wherein selectively distributing the content titles comprises transmitting manifests of the content titles to the plurality of secondary caches, the manifests indicating one or more stream rates corresponding to the content titles.

17. The non-transitory machine-readable medium of claim 16, wherein a manifest of a content title is transformed prior to transmitting to a secondary cache of the plurality of secondary caches, wherein the transformation of the manifest removes one or more entries associated with one or more highest stream rates from the manifest.

18. The non-transitory machine-readable medium of claim 15, wherein the evaluation of the aggregate cache usage data comprises detecting one or more trigger events associated with a particular content title.

19. The non-transitory machine-readable medium of claim 18, wherein the one or more trigger events comprises a cache miss threshold or content request threshold being reached.

20. The non-transitory machine-readable medium of claim 15, wherein a content retrieval queue is maintained, and wherein content retrieval operation is performed in a prioritized order, each retrieval operation associated with a particular content title.

* * * * *